United States Patent
Mehedi et al.

(10) Patent No.: US 11,724,937 B2
(45) Date of Patent: Aug. 15, 2023

(54) METHOD OF DRY REFORMING OF METHANE

(71) Applicant: King Abdulaziz University, Jeddah (SA)

(72) Inventors: Ibrahim Mustafa Mehedi, Jeddah (SA); Bawadi Abdullah, Desa Tronoh Indah (MY); Mohammad Yusuf, Tronoh (MY); Ubaid M. Al-Saggaf, Jeddah (SA); Ahmed Ubaid Al-Saggaf, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/573,242

(22) Filed: Jan. 11, 2022

(65) Prior Publication Data
US 2023/0192484 A1 Jun. 22, 2023

Related U.S. Application Data

(60) Provisional application No. 63/292,668, filed on Dec. 22, 2021.

(51) Int. Cl.
*C01B 3/40* (2006.01)
*B01J 37/02* (2006.01)
(Continued)

(52) U.S. Cl.
CPC .............. *C01B 3/40* (2013.01); *B01J 23/755* (2013.01); *B01J 35/006* (2013.01);
(Continued)

(58) Field of Classification Search
CPC .............. C01B 3/40; C01B 2203/0238; C01B 2203/1052; C01B 2203/1076;
(Continued)

(56) References Cited

U.S. PATENT DOCUMENTS 9,168,511 B2 10/2015 Pieterse
9,180,437 B2 11/2015 Kim et al.
(Continued)

FOREIGN PATENT DOCUMENTS

KR 10-2186058 12/2020
MX 2008001807 A 8/2009
(Continued)

OTHER PUBLICATIONS

Pola, et al. ; Hydrogen Production via Methane Decomposition Using Ni and Ni—Cu Catalysts Supported on MgO, $Al_2O_3$ and $MgAl_2O_4$, Mater. Res. Soc. Symp. Proc. vol. 127 9 © 2010 Materials Research Society ; 13 Pages.
(Continued)

*Primary Examiner* — Douglas B Call
(74) *Attorney, Agent, or Firm* — Oblon, McClelland, Maier & Neustadt, L.L.P.

(57) ABSTRACT

A method of dry reforming of methane ($CH_4$) is provided. The method includes contacting at a temperature of 500 to 1000 degree Celsius (° C.) a reactant gas mixture including methane and carbon dioxide ($CO_2$) with a bimetallic supported catalyst. The bimetallic supported catalyst includes a porous catalyst support and a bimetallic catalyst. The porous catalyst support includes aluminum oxide ($Al_2O_3$) and magnesium oxide (MgO). The bimetallic catalyst includes nickel (Ni) and copper (Cu) disposed on the porous catalyst support. The method further includes collecting a product gas mixture including hydrogen ($H_2$) and carbon monoxide (CO). The bimetallic supported catalyst includes 8 to 16 weight percent (wt. %) nickel and 2 to 14 wt. % copper, each based on a total weight of bimetallic supported catalyst.

17 Claims, 18 Drawing Sheets

(51) Int. Cl.
 *B01J 23/755* (2006.01)
 *B01J 35/10* (2006.01)
 *B01J 37/08* (2006.01)
 *B01J 35/00* (2006.01)

(52) U.S. Cl.
 CPC ....... *B01J 35/0013* (2013.01); *B01J 35/1014* (2013.01); *B01J 35/1038* (2013.01); *B01J 35/1061* (2013.01); *B01J 37/0213* (2013.01); *B01J 37/08* (2013.01); *C01B 2203/0238* (2013.01); *C01B 2203/1052* (2013.01); *C01B 2203/1076* (2013.01); *C01B 2203/1082* (2013.01); *C01B 2203/1241* (2013.01); *C01B 2203/1614* (2013.01); *C01B 2203/1671* (2013.01)

(58) Field of Classification Search
 CPC ...... C01B 2203/1082; C01B 2203/1241; B01J 23/755; B01J 35/0013; B01J 35/006; B01J 35/1014; B01J 35/1038; B01J 35/1061; B01J 37/0213; B01J 37/08
 USPC .......................................................... 252/373
 See application file for complete search history.

(56) References Cited

U.S. PATENT DOCUMENTS

| | | | |
|---|---|---|---|
| 10,814,314 | B2 | 10/2020 | Zhang et al. |
| 2013/0065751 | A1* | 3/2013 | Hong ........................ B01J 37/18 |
| | | | 502/328 |
| 2016/0121305 | A1* | 5/2016 | Kartick ................ B01J 37/0201 |
| | | | 502/328 |
| 2017/0354962 | A1* | 12/2017 | D'Souza ................... C01B 3/40 |
| 2017/0369311 | A1* | 12/2017 | Mamedov .............. B01J 23/755 |

FOREIGN PATENT DOCUMENTS

| | | | |
|---|---|---|---|
| WO | WO2014195904 | * | 12/2014 |
| WO | WO2016087976 | * | 6/2016 |
| WO | WO2016130393 | * | 8/2016 |
| WO | 2020/139094 A2 | | 7/2020 |

OTHER PUBLICATIONS

Silva, et al. ; Evaluation of nickel and copper catalysts in biogas reforming for hydrogen production in SOFC ; Revistamateria, V.22 N.01 ; 2017 ; 11 Pages.

* cited by examiner

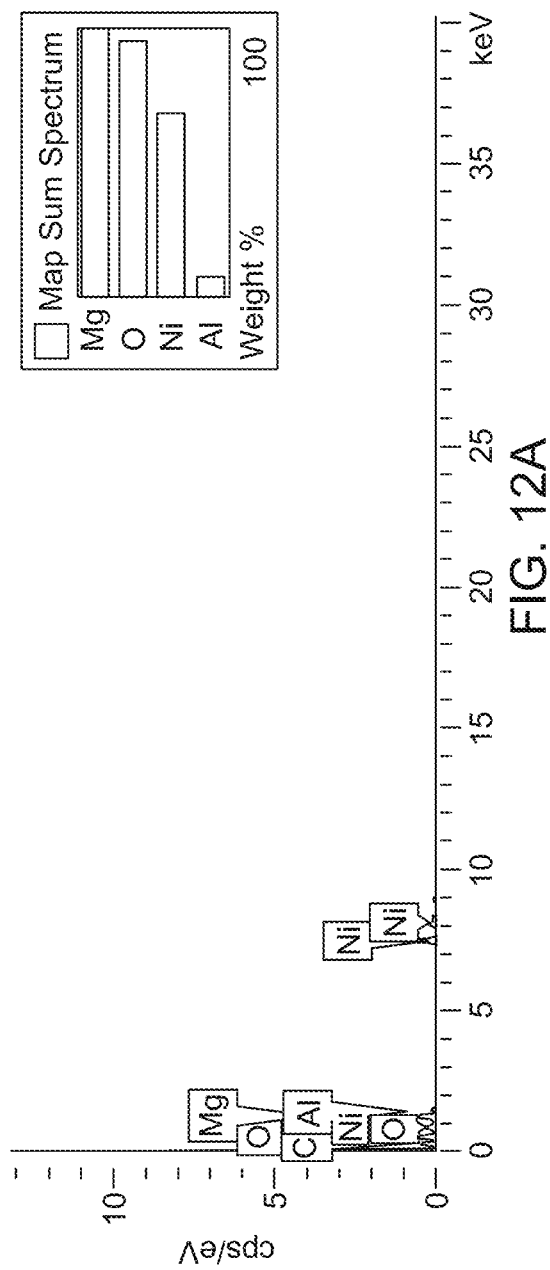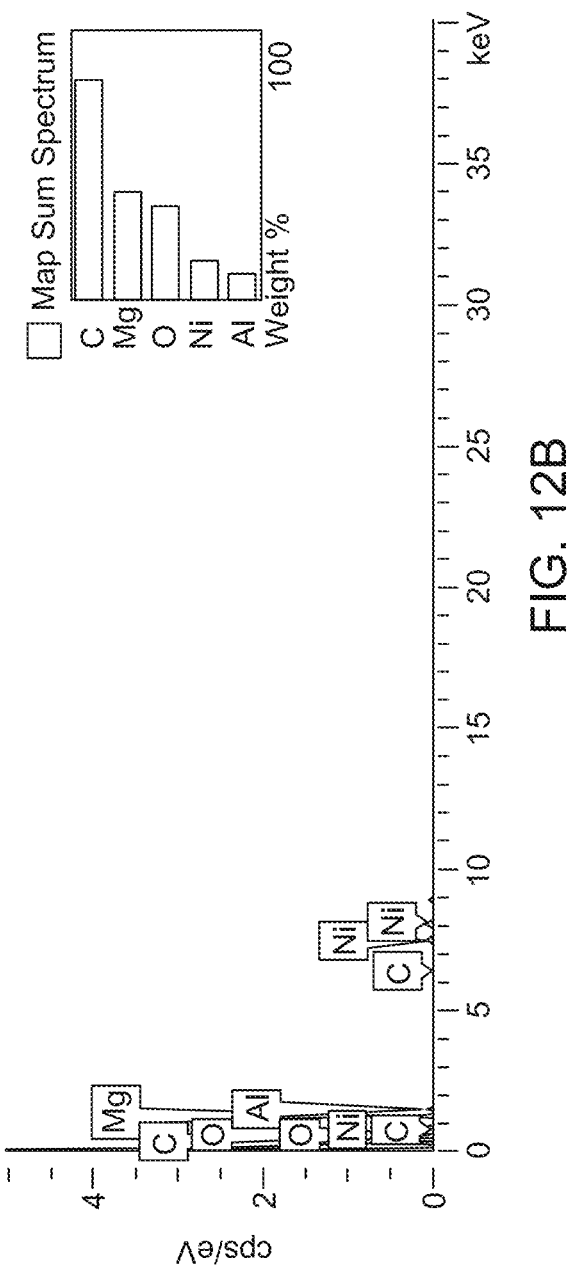
FIG. 12A
FIG. 12B

METHOD OF DRY REFORMING OF METHANE

CROSS-REFERENCE TO RELATED APPLICATION

This present disclosure claims the benefit of U.S. Provisional Application No. 63/292,668, filed on Dec. 22, 2021, which is incorporated herein by reference in its entirety

STATEMENT OF ACKNOWLEDGEMENT

The authors extend their appreciation to the Deputyship for Research & Innovation, Ministry of Education in Saudi Arabia for funding this research work through the project number 2020-070 and King Abdulaziz University, DSR, Jeddah, Saudi Arabia.

BACKGROUND

Technical Field

The present disclosure is directed to a method of dry reforming of methane, particularly using a bimetallic supported catalyst.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Excessive usage of fossil fuels such as petroleum and coal have lead to an increase in global atmospheric greenhouse gas (GHG) levels and particulate air pollution. Primary GHGs in Earth's atmosphere include water vapor ($H_2O$), carbon dioxide ($CO_2$), methane ($CH_4$), nitrous oxide ($N_2O$), and ozone ($O_3$). Increased levels of atmospheric GHGs are the leading cause of climate change. Hence, there is a need for clean fuel sources which do not release GHGs to replace fossil fuels. Dry reforming of methane (DRM) is an environmentally-friendly technique to convert two major GHGs, methane and carbon dioxide, into products useful for use as chemical feedstock: synthesis gas. The synthesis gas, also referred to as syngas, is a mixture of hydrogen ($H_2$) and carbon-monoxide (CO). DRM generally involves chemical reactions that require a catalyst to proceed. Such catalysts are typically metal-based.

Noble metal-based catalysts are desirable for their high catalytic activity in DRM, but are not typically used for commercial purposes due to economic reasons. Therefore, d-block metals such as nickel (Ni) and cobalt (Co) based catalysts are viewed as more viable. Ni-based catalysts in particular have been employed due to their robust catalytic activity and economic feasibility compared to noble metal catalysts. To achieve the desired levels of activity, however, a large amount of Ni-based catalyst must be used. This high Ni loading is not suitable for long term stability. Ni-based catalysts start agglomerating and sintering at high temperatures to give large Ni particles which have decreased surface area available for catalysis. Further, Ni-based catalysts suffer deactivation due to heavy coke formation after a short span of time, particularly at high Ni loading. Catalyst deactivation due to coke formation and sintering at high temperatures are the main hurdles in the commercialization of a DRM reaction. Hence, there is a need of an efficient catalyst which may substantially reduce or eliminate the above limitations.

SUMMARY

In an exemplary embodiment, a method of dry reforming of methane is described. The method of dry reforming of methane includes contacting at a temperature of 500 to 1000 degree Celsius (° C.) a reactant gas mixture including methane and carbon dioxide with a bimetallic supported catalyst including a porous catalyst support including aluminum oxide and magnesium oxide and a bimetallic catalyst including nickel and copper disposed on the porous catalyst support. The method further includes collecting a product gas mixture including hydrogen and carbon monoxide. The bimetallic supported catalyst includes 8 to 16 weight percent (wt. %) nickel and 2 to 14 wt. % copper, each based on a total weight of the bimetallic supported catalyst.

In some embodiments, the porous catalyst support has a molar ratio of aluminum oxide to magnesium oxide of 1:1.05 to 1:4.

In some embodiments, the porous catalyst support has a molar ratio of aluminum oxide to magnesium oxide of 1:1.75 to 1:2.25.

In some embodiments, the bimetallic supported catalyst has a Brunner-Emmett-Teller (BET) surface area of 5 to 55 meter square per gram ($m^2/g$).

In some embodiments, the bimetallic supported catalyst has a mean pore size of 10 to 43 nanometer (nm) and a mean pore volume of 0.15 to 0.37 centimeter cube per gram ($cm^3/g$).

In some embodiments, the bimetallic catalyst is present as nanoparticles including nickel and copper.

In some embodiments, the nanoparticles have a weight ratio of nickel to copper of 6:1 to 1.5:1.

In some embodiments, the nanoparticles have a weight ratio of nickel to copper of 3.5:1 to 2.5:1.

In some embodiments, the nanoparticles have a mean particle size of 15 to 75 nm.

In some embodiments, the reactant gas mixture has a molar ratio of methane to carbon dioxide of 0.9:1 to 1.5:1.

In some embodiments, the reactant gas mixture has a molar ratio of methane to carbon dioxide of 1.10:1 to 1.30:1.

In some embodiments, the product gas mixture has a molar ratio of hydrogen to carbon monoxide of 0.90:1 to 1.1:1.

In some embodiments, the method converts 80 to 92.5% of an initial amount of methane present in the reactant gas mixture.

In some embodiments, the method converts 85 to 95% of an initial amount of carbon dioxide present in the reactant gas mixture.

In some embodiments, the reactant gas mixture is substantially free of water.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIGS. 12A-12B are Energy Dispersive X-Ray Analysis (EDX) spectra of the monometallic 12% Ni/$Al_2O_3$—MgO fresh and spent catalysts.

DETAILED DESCRIPTION

Figure 1:
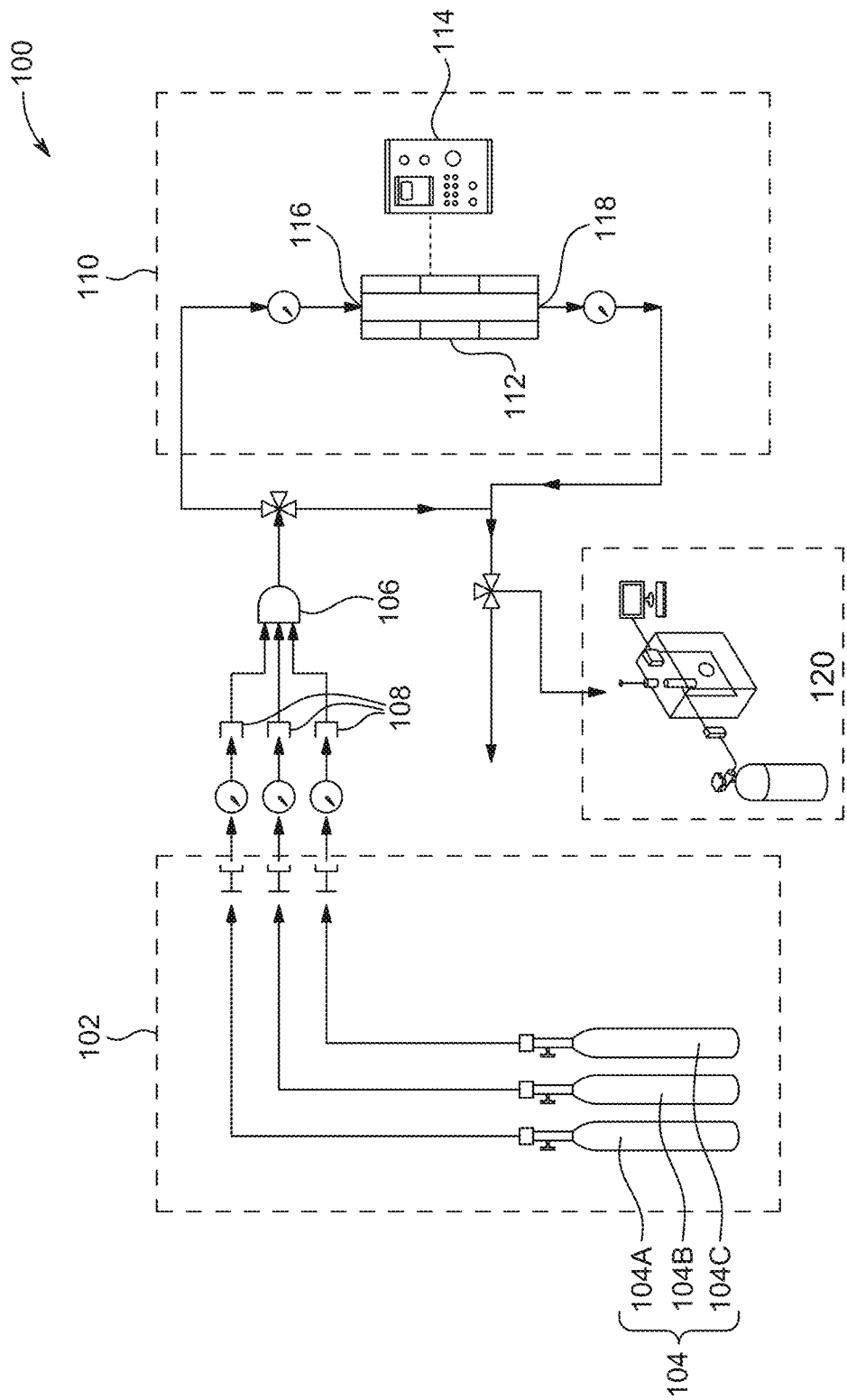
FIG. 1 is a schematic block diagram of a Dry Reforming of Methane (DRM) apparatus, according to certain embodiments.

In the drawings, like reference numerals designate identical or corresponding parts throughout the several views. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, the phrase "substantially free", unless otherwise specified, describes a particular component being present in an amount of less than about 1 wt %, preferably less than about 0.5 wt %, more preferably less than about 0.1 wt %, even more preferably less than about 0.05 wt %, even more preferably less than about 0.01 wt %, even more preferably less than about 0.001 wt %, yet even more preferably 0 wt %, relative to a total weight of the composition being discussed.

Referring to FIG. 1, a schematic block diagram of an exemplary DRM apparatus 100 is illustrated according to an embodiment. A DRM reaction takes place within the DRM apparatus 100. The DRM apparatus 100 includes a feed section 102. The feed section 102 includes a plurality of containers 104 including a first container 104A, a second container 104B and a third container 104C holding carbon dioxide, methane, and an additive gas, respectively. The first container 104A, the second container 104B and the third container 104C are collectively referred to as 'the containers 104' and individually referred to as 'the container 104' unless otherwise specified. In general the additive gas may be any suitable inert gas. Examples of suitable inert gases include, but are not limited to, nitrogen ($N_2$), helium (He), neon (Ne), argon (Ar), and mixtures thereof. In some embodiments, the DRM apparatus 100 may include two containers such as the first container 104A and the second container 104B. A reactant gas mixture is obtained in a mixer 106, via mass flow controllers 108, which allow desired amount of gases to be dispersed out of the feed section 102. The mixer 106 is configured to fluidly couple with the feed section 102 and a reactor section 110 through a plurality of flow control valves and conduits. As used herein, the term "fluidly couple" refers to the conduits through which the reactant gas mixture is allowed to flow between the feed section 102 and the reactor section 110. It should be understood that various other components, such as valves, flow gauges, flowrate monitors, pressure gauges, pressure sensors, temperature sensors, composition analyzers, heat exchangers, and the like, may be present at appropriate locations in the feed section. Further, additional connections not depicted may be present at appropriate locations between appropriate components, such as pressure interconnects, diversion pathways, maintenance or cleaning pathways, bypass pathways, and the like.

The reactor section 110 includes a reactor 112 containing a bimetallic supported catalyst described below. In some embodiments, various operations of the reactor 112 are controlled by a controller. In some embodiments, the controller controls all operations of the feed section 102 and the reactor section 110. In some embodiments, the controller is a control panel 114 disposed in the reactor section 110. In some embodiments, the control panel 114 may be located out of the reactor section 110. For example, the reactor 112 and/or feed section 102 may be controlled or operated by a computer connected as appropriate to various portions or pieces of equipment (e.g. valves, flowrate controllers, gagues, sensors, analyzers, etc.) in the rector 112 and/or feed section 102. The reactor 112 includes an inlet 116 through which the reactor gas mixture enters the reactor 112. Further, a product gas mixture is ejected out of the reactor 112 through an outlet 118. In some embodiments, the DRM apparatus 100 may include an analyzer 120. The analyzer 120 may comprise additional components such as a composition analyzer, a condenser, a drying apparatus such as drierite or other dessicant bed, and sensors such as pressure sensors, flowrate sensors, and temperature sensors. The analyzyer may help to detect and analalyze various characterstics of the product gas mixture. The results of such analysis may be used to control the operation of the DRM apparatus. In some embodiments, the analyzer is configured to provide data comprising properties of the product gas mixture to the controller.

Figure 2:
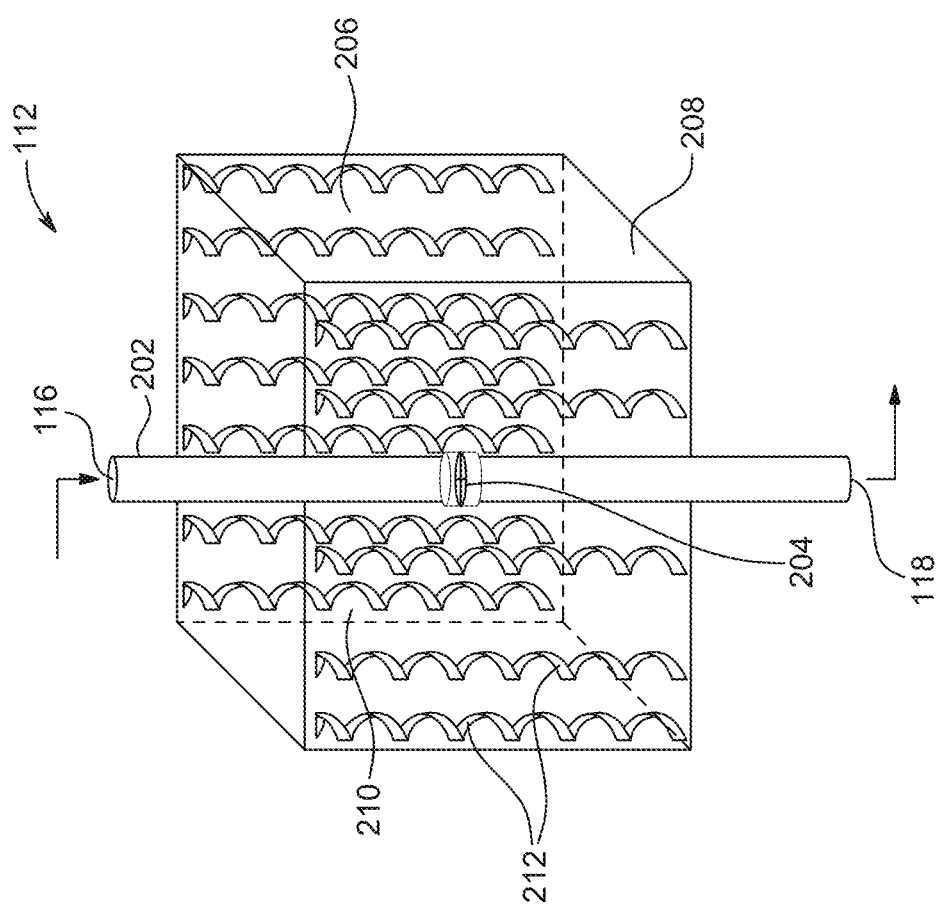
FIG. 2 is a schematic perspective view of a reactor of the DRM apparatus of FIG. 1, according to certain embodiments.

Referring to FIG. 2, a schematic perspective view of the reactor 112 of the DRM apparatus 100 is illustrated according to an embodiment. In an embodiment, the reactor 112 includes a tubular member 202. The tubular member 202 includes a catalytic bed 204. The catalytic bed 204 is configured to hold the bimetallic supported catalyst. The tubular member 202 includes the inlet 116, the outlet 118, and a furnace 206. As shown in the exemplary embodiment depicted in FIG. 2, a cross sectional shape of the furnace 206 is square. In some embodiments, the cross-sectional shapes of the furnace 206 may be, but not limited to, a circle shape, an oval shape, a polygonal shape, and a rectangular shape. The furnace 206 includes an outer surface 208 and an inner surface 210. A plurality of heating coils 212 is attached to the inner surface 210 of the furnace 206. In an embodiment, the reactor 112 may be made up of a material such as a stainless steel, an aluminum alloy and a combination thereof. The plurality of heating coils 212 provides a required temperature to the tubular member 202 to carry out the DRM reaction. The plurality of heating coils 212 may rise the temperature of the reactor 112 up to 1000 degree Celsius (° C.).

Figure 3:
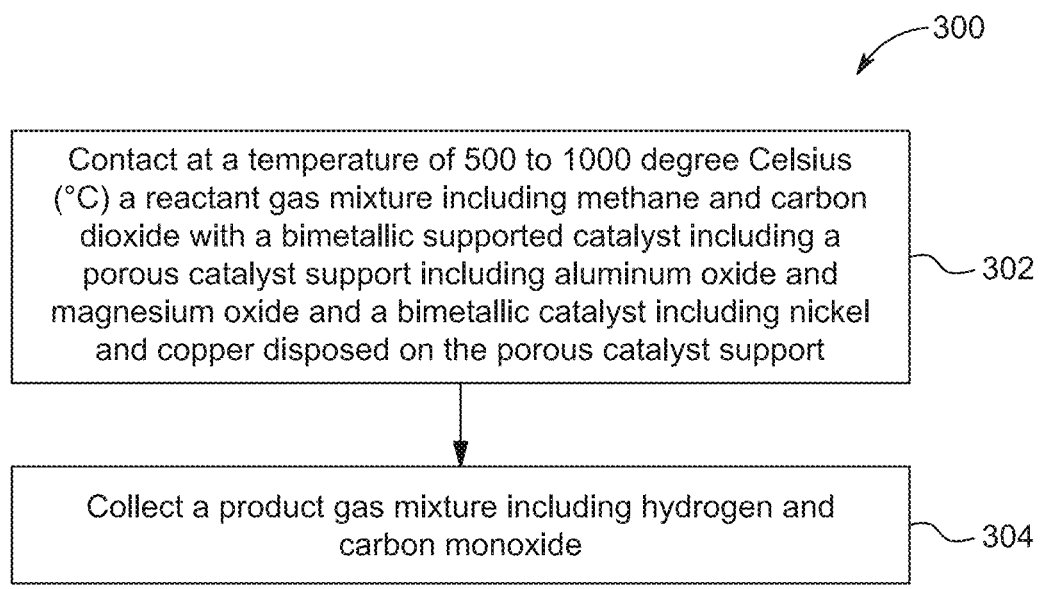
FIG. 3 is a schematic flow diagram of a method of DRM, according to certain embodiments.

Referring to FIG. 3, a schematic flow diagram of a method 300 of dry reforming of methane is illustrated according to an embodiment. The method 300 is described with reference to the DRM apparatus 100 and the reactor 112 illustrated in FIG. 1 and FIG. 2, respectively. The order in which the method 300 is described is not intended to be construed as a limitation, and any number of the described method steps can be combined in any order to implement the method 300. Additionally, individual steps may be removed or skipped from the method 300 without departing from the spirit and scope of the present disclosure. In an embodiment, the method 300 may be executed by the DRM apparatus 100 of the present disclosure.

At step 302, the method 300 includes contacting at a temperature of 500 to 1000° C., preferably 550 to 950° C., preferably 600 to 900° C., preferably 625 to 850° C., preferably 700 to 825° C., preferably 725 to 800° C., preferably 750 to 775° C., preferably 760 to 770° C., the reactant gas mixture including methane and carbon dioxide, with the bimetallic supported catalyst. In an embodiment, the reactant gas mixture has a molar ratio of methane to carbon dioxide of 0.9:1 to 1.5:1, preferably 0.95:1 to 1.45:1, preferably 1.0:1 to 1.40:1, preferably 1.05:1 to 1.35:1, preferably 1.10:1 to 1.30:1, preferably 1.125:1 to 1.25:1, preferably 1.15:1 to 1.225:1, preferably 1.175:1 to 1.20:1, preferably 1.180:1 to 1.195:1. In preferred embodiments, the reactant gas mixture is substantially free of water ($H_2O$). In some embodiments, the method 300 converts 80 to 92.5%, preferably 82.5 to 90%, preferably 85 to 87.5%, preferably 86 to 87% of an initial amount of methane present in the reactant gas mixture. In some embodiments, the amount of methane is measured in moles. In some embodiments, the method 300 converts 85 to 95%, preferably 87.5 to 94%, preferably 88 to 93%, preferably 88.5 to 92.5%, preferably 89 to 92%, preferably 89.5 to 91.5%, preferably 90 to 91% of an initial amount of carbon dioxide present in the reactant gas mixture. In some embodiments, the amount of carbon dioxide is measured in moles.

The bimetallic supported catalyst includes a porous catalyst support comprising aluminum oxide ($Al_2O_3$) and magnesium oxide (MgO). The aluminum oxide may be any polymorph or phase of aluminum oxide. In some embodiments, the aluminum oxide is amorphous aluminum oxide. In some embodiments, the aluminum oxide is crystalline aluminum oxide. The crystalline aluminum oxide may adopt any suitable crystal structure or be any suitable phase of aluminum oxide. Examples of such phases include $\alpha\text{-}Al_2O_3$, $\chi\text{-}Al_2O_3$, $\eta\text{-}Al_2O_3$, $\delta\text{-}Al_2O_3$, $\kappa\text{-}Al_2O_3$, $\theta\text{-}Al_2O_3$, $\gamma\text{-}Al_2O_3$, $\rho\text{-}Al_2O_3$, and $\beta\text{-}Al_2O_3$. The magnesium oxide may be any polymorph or phase of magnesium oxide. In some embodiments, the magnesium oxide is amorphous magnesium oxide. In some embodiments, the magnesium oxide is crystalline magnesium oxide.

The crystalline aluminum oxide may adopt any suitable crystal structure or be any suitable phase of aluminum oxide. Examples of such phases include the B1 phase (halite crystal structure) and the B2 phase (calcium chloride crystal structure). In some embodiments, the porous catalyst support comprises distinct particles of aluminum oxide and particles of magnesium oxide. In some embodiments, the porous catalyst support comprises a single material comprising both aluminum oxide and magnesium oxide. In such embodiments, the aluminum oxide and magnesium oxide exist together in the particle as distinct phases, grains, or crystallographic regions. In some embodiments, the aluminum oxide and magnesium oxide exist together in the particle as a single phase. In such embodiments, the single phase may have a chemical formula described as $Al_2MgO_4$. In some embodiments, the porous catalyst support has a molar ratio of aluminum oxide to magnesium oxide of 1:1.05 to 1:4, preferably 1:1.1 to 1:3.5, preferably 1:1.25 to 1:3.0, preferably 1:1.5 to 1:2.5, preferably 1:1.75 to 1:2.25, preferably 1:1.85 to 1:2.15, preferably 1:1.90 to 1:2.10, preferably 1:1.95 to 1:2.05, preferably 1:2. The single material comprising both aluminum oxide and magnesium oxide may have an ordered or disordered structure. Such ordering may refer to any suitable structure property, such as a distribution of aluminum and magnesium ions, a distribution of aluminum oxide portions and magnesium oxide portions, a crystal structure, a pore structure, or a material topology. In some embodiments, the single material comprising both aluminum oxide and magnesium oxide has an ordered pore structure comprising a regular arrangement of similarly sized pores, the arrangement being any suitable arrangement known to one of ordinary skill in the art. In some embodiments, the single material comprising both aluminum oxide and magnesium oxide is defined by a material topology. The topology of the material indicates properties of the crystalline framework such as size, shape, orientation, density, and number of types of pores or channels present in the crystalline framework. A single topology may have one or more types of pores or channels. In such embodiments, the single material comprising both aluminum oxide and magnesium oxide may be defined by a single material topology.

In one embodiment, the bimetallic supported catalyst has a mean pore size of 10 to 43, preferably 11 to 42 nm, preferably 12 to 41 nm, preferably 13 to 40 nm, preferably 14 to 39 nm, preferably 15 to 38 nm, preferably 16 to 37 nm, preferably 17 to 36, preferably 18 to 35 nm, preferably 19 to 34 nm, preferably 20 to 33 nm, preferably 21 to 32 nm, preferably 22 to 31 nm, preferably 23 to 30 nm, preferably 24 to 29 nm, preferably 25 to 28 nm, preferably 26 to 27 nanometer (nm). In some embodiments, the porous catalyst support has a mean pore volume of 0.15 to 0.37, preferably 0.16 to 0.32, preferably 0.17 to 0.29, preferably 0.18 to 0.27, preferably 0.19 to 0.25, preferably 0.20 to 0.23, preferably 0.21 centimeter cube per gram ($cm^3/g$). In some embodiments, the bimetallic supported catalyst has a Brunner-Emmett-Teller (BET) surface area of 5 to 55, preferably 10 to 52.5, preferably 15 to 50, preferably 20 to 47.5, preferably 25 to 45, preferably 26 to 44, preferably 27 to 43, preferably 28 to 42, preferably 28.5 to 41, preferably 29 to 40 meter square per gram ($m^2/g$).

In some embodiments, the porous catalyst support takes the form of particles. In general, the porous catalyst support particles can be any shape known to one of ordinary skill in the art. Examples of suitable shapes the porous catalyst support particles may take include spheres, spheroids, lentoids, ovoids, solid polyhedra such as tetrahedra, cubes, octahedra, icosahedra, dodecahedra, hollow polyhedral, stellated polyhedral (both regular and irregular), triangular prisms, hollow spherical shells, tubes, rods, and mixtures thereof.

In some embodiments, the porous catalyst support particles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of nanoparticles having a different shape. As used herein, the term "non-uniform shape" refers to an average consistent shape that differs by more than 10% of the distribution of nanoparticles having a different shape.

In general, the porous catalyst support may be prepared by any suitable technique known to one of ordinary skill in the art. In some embodiments, the porous catalyst support particles are prepared by a method which comprises dissolving an aluminum precursor and a magnesium precursor in water to form a metal precursor solution; adding an ammonia solution at a temperature of 60 to 100° C., preferably 65 to 95° C., preferably 70 to 90° C., preferably 75 to 85° C., preferably 80° C. to form a precipitation solution, aging the precipitation solution for 2 to 20 h, preferably 4 to 16 h, preferably 6 to 14 h, preferably 8 to 12 h, preferably 10 h at a temperature of 60 to 100° C., preferably 65 to 95° C., preferably 70 to 90° C., preferably 75 to 85° C., preferably 80° C. to form a precipitate, and calcining the precipitate at 700 to 1000° C., preferably 750 to 950° C., preferably 800 to 900° C. preferably 825 to 875° C., preferably 850° C. for 4 h to form the porous catalyst support. In some embodiments, the ammonia solution has a concentration of 28 wt. % in water. In some embodiments, the ammonia solution is added dropwise to the mixture while maintaining the pH at about 8.5 to 10, preferably 9 to 9.5. In some embodiments, the method further comprises washing the precipitate with distilled water. In some embodiments, the method further comprises drying the washed precipitate at 90 to 125° C., preferably 100 to 115° C., preferably 110° C. for 6 to 24 h, preferably 8 to 20 h, preferably 10 to 16 h, preferably 12 h. In some embodiments, the calcining is performed in a furnace under static air. In some embodiments, the calcining is performed using a ramping rate of 5 degree Celsius per minute (° C./minute).

The bimetallic supported catalyst includes a bimetallic catalyst including nickel and copper disposed on the porous catalyst support. The bimetallic supported catalyst includes 8 to 16, preferably 9 to 15, preferably 10 to 14, preferably 10.5 to 13.5, preferably 11 to 13, preferably 11.25 to 12.75, preferably 11.5 to 12.5, preferably 11.75 to 12.25, preferably 11.9 to 12.1, preferably 12 weight percent (wt. %) nickel and 2 to 14, preferably 2.25 to 12, preferably 2.5 to 10, preferably 2.75 to 8, preferably 3 to 6, preferably 3.25 to 5.5, preferably 3.5 to 5, preferably 3.75 to 4.5, preferably 4 wt. % copper, each based on a total weight of the bimetallic supported catalyst. In some embodiments, the bimetallic catalyst is present as separate nanoparticles of nickel and nanoparticles of copper. In some embodiments, the bimetallic catalyst is present as nanoparticles including nickel and copper. Such nanoparticles may have a homogeneous distribution of nickel and copper atoms or a non-homogeneous distribution of nickel and copper atoms. For example, the nanoparticles may be formed of a bimetallic alloy, have a mixed but non-uniform distribution of nickel and copper, be Janus particles having a nickel side and a copper side, or have stripes of nickel and stripes of copper. In an embodiment, the nanoparticles have a weight ratio of nickel to copper of 6:1 to 1.5:1, preferably 5:1 to 1.75:1, preferably 4:1 to 2:1, preferably 3.75:1 to 2.25:1, preferably 3.5:1 to 2.5:1, preferably 3.4:1 to 2.6:1, preferably 3.3:1 to 2.7:1, preferably 3.2:1 to 2.8:1, preferably 3.1:1 to 2.9:1, preferably 3:1.

In general, the nanoparticles can be any shape known to one of ordinary skill in the art. Examples of suitable shapes the nanoparticles may take include spheres, spheroids, lentoids, ovoids, solid polyhedra such as tetrahedra, cubes, octahedra, icosahedra, dodecahedra, hollow polyhedral (also known as nanocages), stellated polyhedral (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), and mixtures thereof. In the case of nanorods, the rod shape may be defined by a ratio of a rod length to a rod width, the ratio being known as the aspect ratio. For nanoparticles of the current invention, nanorods should have an aspect ratio less than 1000, preferably less than 750, preferably less than 500, preferably less than 250, preferably less than 100, preferably less than 75, preferably less than 50, preferably less than 25. Nanorods having an aspect ratio greater than 1000 are typically referred to as nanowires and are not a shape that the nanoparticles are envisioned as having in any embodiments.

In some embodiments, the nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of nanoparticles having a different shape. As used herein, the term "non-uniform shape" refers to an average consistent shape that differs by more than 10% of the distribution of nanoparticles having a different shape. In one embodiment, the shape is uniform and at least 90% of the nanoparticles are spherical or substantially circular, and less than 10% are polygonal. In another embodiment, the shape is non-uniform and less than 90% of the nanoparticles are spherical or substantially circular, and greater than 10% are polygonal.

In some embodiments, the nanoparticles have a mean particle size of 15 to 75 nm, preferably 17.5 to 70 nm, preferably 20 to 65 nm, preferably 22.5 to 62.5 nm, preferably 25 to 60 nm, preferably 27.5 to 57.5 nm, preferably 30 to 55 nm, preferably 32.5 to 52.5 nm, 35 to 50 nm, preferably 37.5 to 47.5 nm, preferably about 40 to 45 nm. In embodiments where the nanoparticles are spherical, the particle size may refer to a particle diameter. In embodiments where the nanoparticles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the nanoparticles have an anisotropic shape such as nanorods, the particle size may refer to a length of the nanorod, a width of the nanorod, an average of the length and width of the nanorod. In some embodiments in which the nanoparticles have non-spherical shapes, the particle size refers to the diameter of a sphere having an equivalent volume as the particle. In some embodiments in which the nanoparticles have non-spherical shapes, the particle size refers to the diameter of a sphere having an equivalent diffusion coefficient as the particle.

In some embodiments, the nanoparticles of the present disclosure are monodisperse, having a coefficient of variation or relative standard deviation, expressed as a percentage and defined as the ratio of the particle size standard deviation (σ) to the particle size mean (μ) multiplied by 100 of less than 25%, preferably less than 10%, preferably less than 8%, preferably less than 6%, preferably less than 5%, preferably less than 4%, preferably less than 3%, preferably less than 2%. In some embodiments, the nanoparticles of the present disclosure are monodisperse having a particle size distribution ranging from 80% of the average particle size to 120% of the average particle size, preferably 90-110%, preferably 95-105% of the average particle size. In some embodiments, the nanoparticles are not monodisperse.

In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

In some embodiments, the bimetallic supported catalyst is prepared by dissolving a nickel precursor and a copper precursor in water to form a nanoparticle precursor solution, adding the nanoparticle precursor solution to the porous catalyst support to form a loaded support, aging the loaded support for 2 to 20 h, preferably 4 to 16 h, preferably 6 to 14 h, preferably 8 to 12 h, preferably 10 h at a temperature of 60 to 100° C., preferably 65 to 95° C., preferably 70 to 90° C., preferably 75 to 85° C., preferably 80° C. to form an aged loaded support, and calcining the aged loaded support at 700 to 1000° C., preferably 750 to 950° C., preferably 800 to 900° C. preferably 825 to 875° C., preferably 850° C. for 4 h to form the bimetallic supported catalyst. In some embodiments, the calcining is performed in static air.

At step 304, the method 300 includes collecting the product gas mixture including hydrogen and carbon monoxide. The product gas mixture is otherwise referred to as syngas. In one embodiment, the product gas mixture has a molar ratio of hydrogen to carbon monoxide of 0.90:1 to 1.1:1, preferably 0.95:1 to 1.05:1, preferably 1:1. The product gas mixture may be condensed using a condenser.

The examples below are intended to further illustrate protocols for performing the method and preparing and characterizing the bimetallic supported catalyst and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein

EXAMPLES

The following examples describe and demonstrate exemplary embodiments of the DRM reaction described herein. The examples are provided solely for the purpose of illustration and are not to be construed as limitations of the present disclosure, as many variations thereof are possible without departing from the spirit and scope of the present disclosure.

Example 1

Materials Used

Precursor chemical salts Nickel Nitrate Hexahydrate (Ni$(NO_3)_2 \cdot 6H_2O$), Cupric Nitrate Trihydrate Cu$(NO_3)_2 \cdot 3H_2O$, Magnesium Nitrate Hexahydrate (Mg$(NO_3)_2 \cdot 6H_2O$), Aluminum Nitrate Hexahydrate (Al$(NO_3)_3 \cdot 9H_2O$) and ammonia solution (28 wt. %) were used for catalysts synthesis. Further, quartz wool, deionized water, and reaction gases, i.e., $N_2$, $H_2$, $CH_4$, and $CO_2$ with percent purity, were also used. The chemical salts used along with percent purity are displayed in Table 1.

TABLE 1

List of precursor salts used in the catalysts synthesis

| Chemical Name | Linear formula | Mass fraction purity |
|---|---|---|
| Nickel Nitrate Hexahydrate | $Ni(NO_3)_2 \cdot 6H_2O$ | >99.9% |
| Cupric Nitrate Trihydrate | $Cu(NO_3)_2 \cdot 3H_2O$ | >99.9% |
| Magnesium Nitrate Hexahydrate | $Mg(NO_3)_2 \cdot 6H_2O$ | >99% |
| Aluminum Nitrate Hexahydrate | $Al(NO_3)_3 \cdot 9H_2O$ | >99% |
| Ammonia Solution | $NH_4OH$ | 28 wt.% |

Method of Preparation

Figure 4:
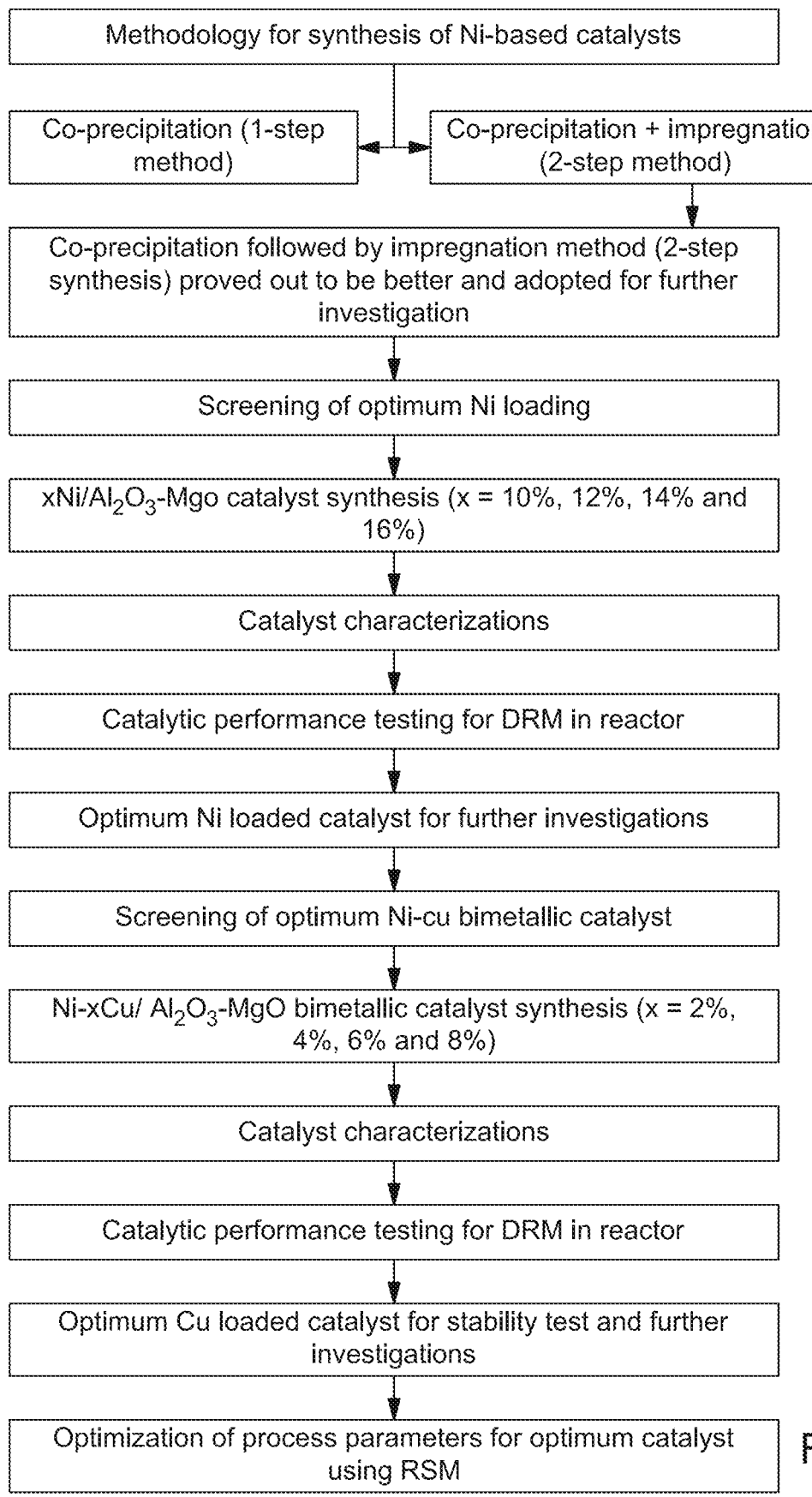
FIG. 4 is a schematic block diagram of a workflow of synthesis of catalysts.

Referring to FIG. 4, a schematic block diagram of workflow of synthesis of catalysts is illustrated. The catalysts were prepared by employing a two-step synthesis method. The two-step synthesis method includes a co-precipitation method followed by an impregnation method. The co-precipitation method is defined as a simultaneous precipitation of a soluble component with a macro-component from the same solution by the formation of mixed crystals, by adsorption, occlusion or mechanical entrapment. The impregnation method is loading of a porous support with a metal component in a solid-state way. A porous catalyst support ($Al_2O_3$:MgO) of 1:2 was prepared by the co-precipitation method employing $Al(NO_3)_3.9H_2O$ and $Mg(NO_3)_2.6H_2O$ salts (from Sigma Aldrich) as the precursor chemical salts.

Stoichiometric quantity of the precursor chemical salts was dissolved in distilled water at constant stirring on a hot plate magnetic stirrer at a temperature of 80° C. until a clear solution is obtained. Thereafter, ammonia solution (28 wt. % in water) is added dropwise to the mixture as a precipitating agent with constant stirring while maintaining the pH at about 9-9.5 throughout the stirring. The mixture is aged for 10 hours (h) with continuous stirring at 80° C. The precipitate formed is washed and filtered with distilled water. The slurry obtained was dried at 110° C. for 12 h and then calcined at 850° C. for 4 h in a furnace under static air (ramping rate of 5 degree Celsius per minute (° C./minute)). The stoichiometric amounts of Ni ($Ni(NO_3)_2.6H_2O$) salt was weighed and mixed with distilled water to the known weight of the porous catalyst support to obtain the different monometallic Ni catalysts.

Similarly, stoichiometric amounts of Ni as ($Ni(NO_3)_2.6H_2O$) and Cu as $Cu(NO_3)_2.3H_2O$) salts were weighed and mixed with distilled water to the known weight of the porous catalyst support to obtain different bimetallic supported catalysts. The procedure is conducted by addition of water on the porous catalyst support until the first drop of water appeared on the surface of the porous catalyst support, which indicated that the porous catalyst support is saturated and cannot absorb water anymore. The mixture is aged for 6 h under constant stirring at 80° C. The excess water is then evaporated and dried at 110° C. for 12 h, and the bimetallic supported catalyst is calcined at 850° C. for 4 h in static air.

Hence, a series of differently Ni loaded catalysts (i.e., 10 wt. % (Ni10), 12 wt. % (Ni12), 14 wt. % (Ni14) and 16 wt. % (Ni16)) were obtained. The 12 wt. % Ni loaded catalyst has shown the desired performance and hence used for further investigation for bimetallic catalysts. Thereafter, a series of catalysts having fixed Ni amount (i.e., 12 wt. % Ni/$Al_2O_3$—MgO) and varying Cu concentration (in wt. %) has been prepared as 12% Ni/$Al_2O_3$—MgO, 12% Ni-2% Cu/$Al_2O_3$—MgO, 12% Ni-4% Cu/$Al_2O_3$—MgO, 12% Ni-6% Cu/$Al_2O_3$—MgO, and 12% Ni-8% Cu/$Al_2O_3$—MgO. The fresh catalysts are catalysts which are not used in a chemical reaction such as the DRM reaction. Further, spent catalyst are catalysts which have been used in a chemical reaction such as the DRM reaction. The spent catalyst may include deposition of coke formed during side reactions going along with the DRM reaction. The side reactions may include methane cracking and a Boudouard reaction.

Example 3

Figure 5A:
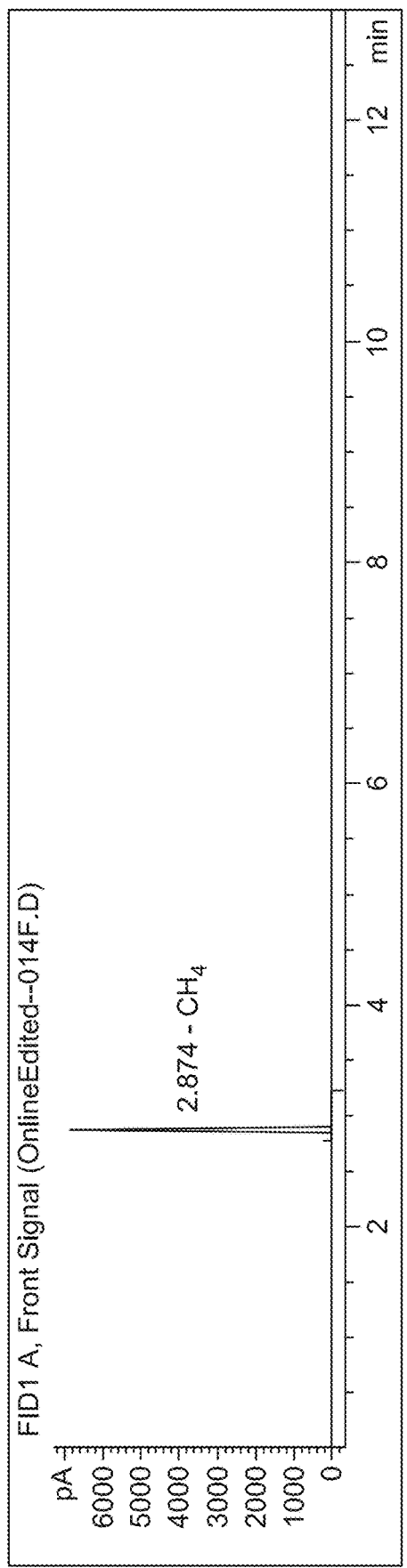
FIGS. 5A-5B are graphical representations of Flame Ionization Detection (FID) and Gas Chromatography-Thermal Conductivity Detections (GC-TCD), respectively.
Figure 5B:
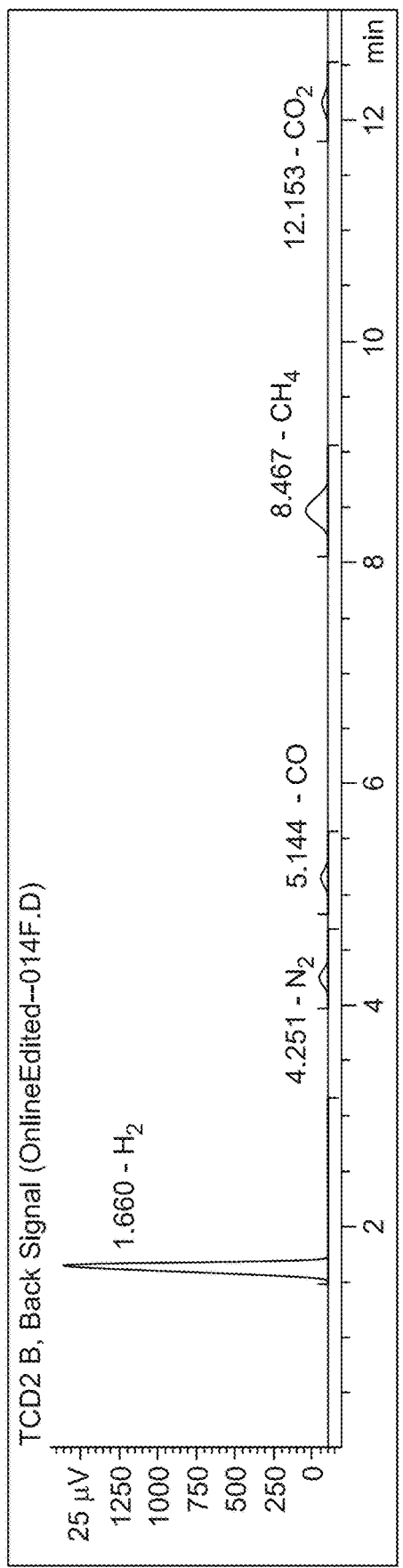

Referring to FIGS. 5A-5B, graphical representations of Flame Ionization Detection (FID) and Gas Chromatography-Thermal Conductivity Detections (GC-TCD) are illustrated, respectively. The FID is an automotive emissions industry standard method of measuring hydrocarbon (HC) concentration. A sample gas (methane gas) was introduced into a hydrogen flame inside the FID. The FID confirms the presence of methane gas. The TCD is a universal, nondestructive, concentration-sensitive detector that responds to the difference in thermal conductivity of a carrier gas (hydrogen and helium) and the carrier gas containing a sample gas. Further, different peaks (FIG. 5B) such as for carbon monoxide, hydrogen, nitrogen, methane, carbon-dioxide of the GC-TCD confirm the progression of the DRM reaction.

Figure 6A:
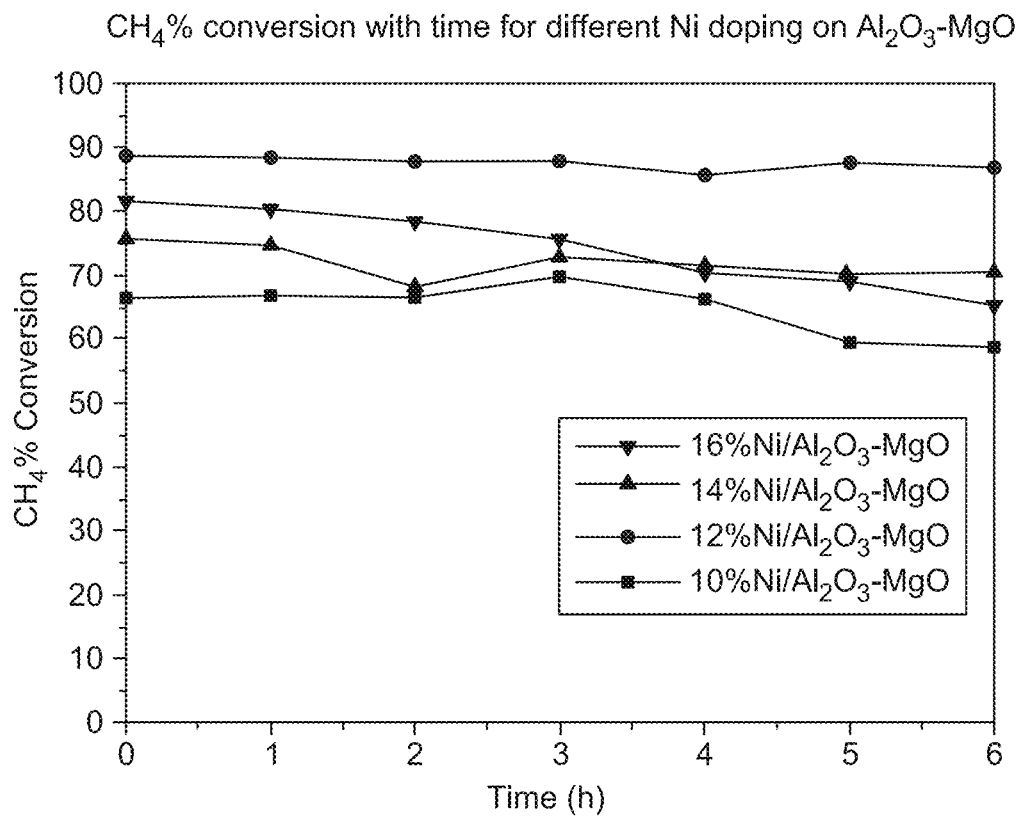
FIGS. 6A-6C are graphical representations showing performance of a porous catalyst support impregnated with different weight percentages of Ni catalyst.
Figure 6B:
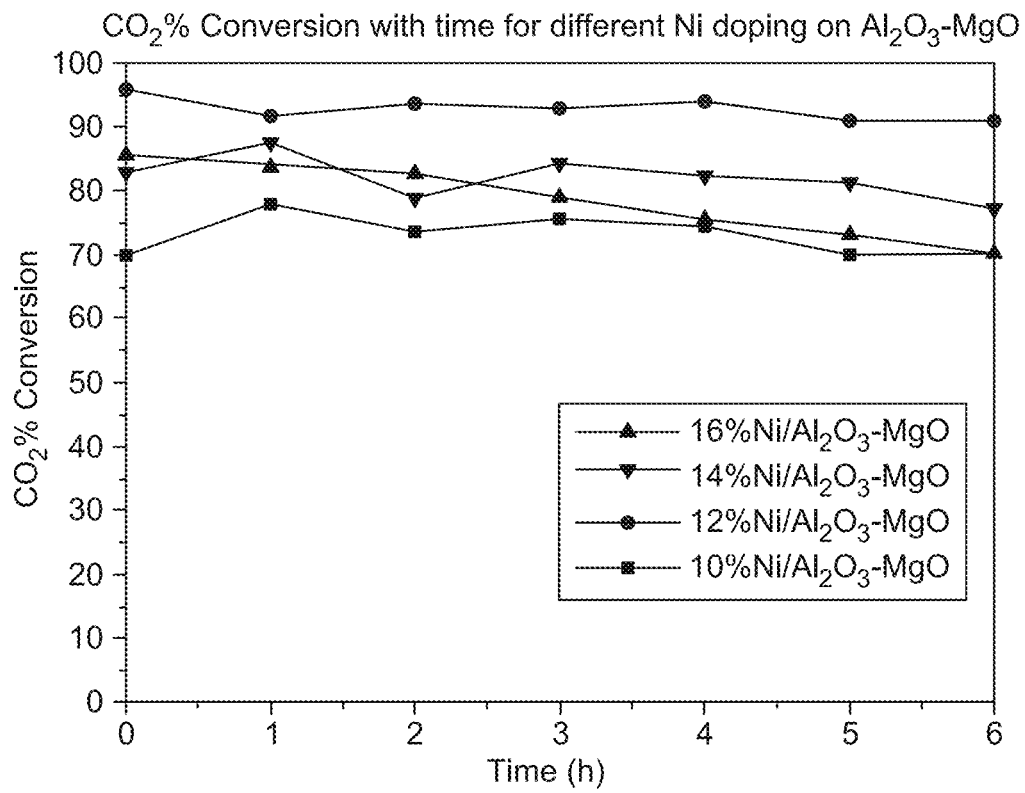
Figure 6C:
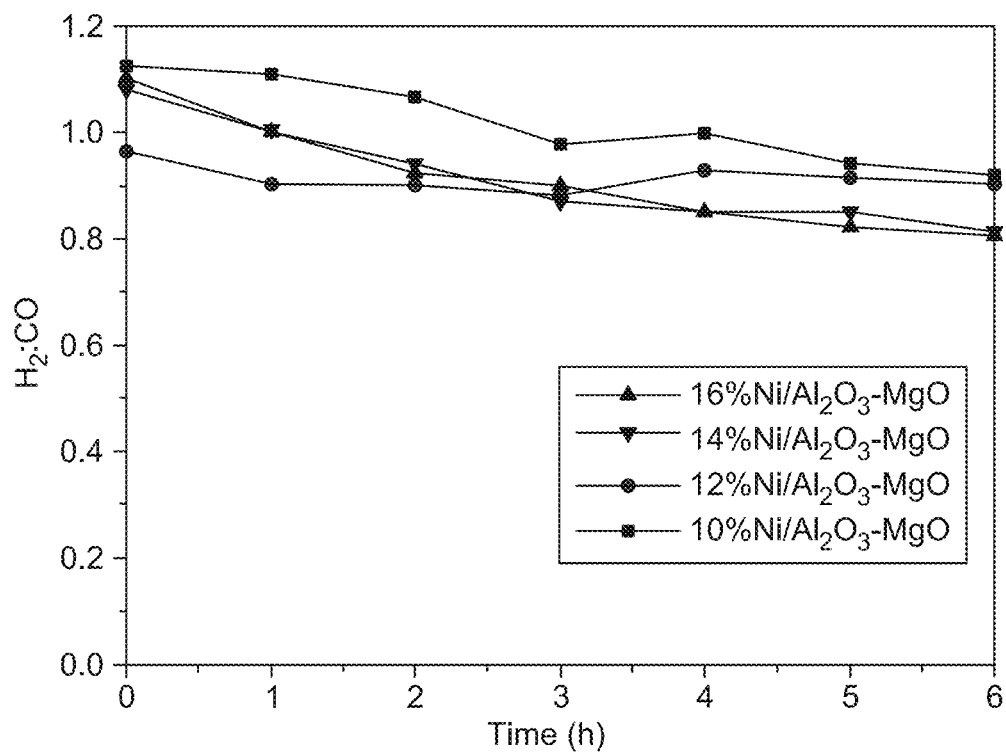

Referring to FIGS. 6A-6C, graphical representations of performance of the porous catalyst support impregnated with different weight percentages of Ni are illustrated. The porous catalyst support impregnated with Ni catalyst for 6 hours of the DRM reaction at 800° C. is used. On increasing weight percentage of Ni from 10% to 12%, efficiency of 12% Ni/$Al_2O_3$—MgO also increases. Further, increase in weight percentage of Ni from 12% to 14% and 16% has decreased the efficiencies of 14% Ni/$Al_2O_3$—MgO and 16% Ni/$Al_2O_3$—MgO. Maximum conversion of initial amounts of methane and carbon-dioxide (FIGS. 6A-6B) present in the reactant gas mixture is observed with 12% Ni/$Al_2O_3$—MgO. FIG. 6C shows that increasing weight percentage of Ni from 10% to 12% shows similar efficiency. However, increasing weight percentage of Ni from 12% to 14% and 16% shows a decrease in the efficiency of 14% Ni/$Al_2O_3$—MgO and 16% Ni/$Al_2O_3$—MgO. Hence, $Al_2O_3$—MgO supporting 12% Ni amount is sufficient to bring desired results and shows highest performance.

Figure 7:
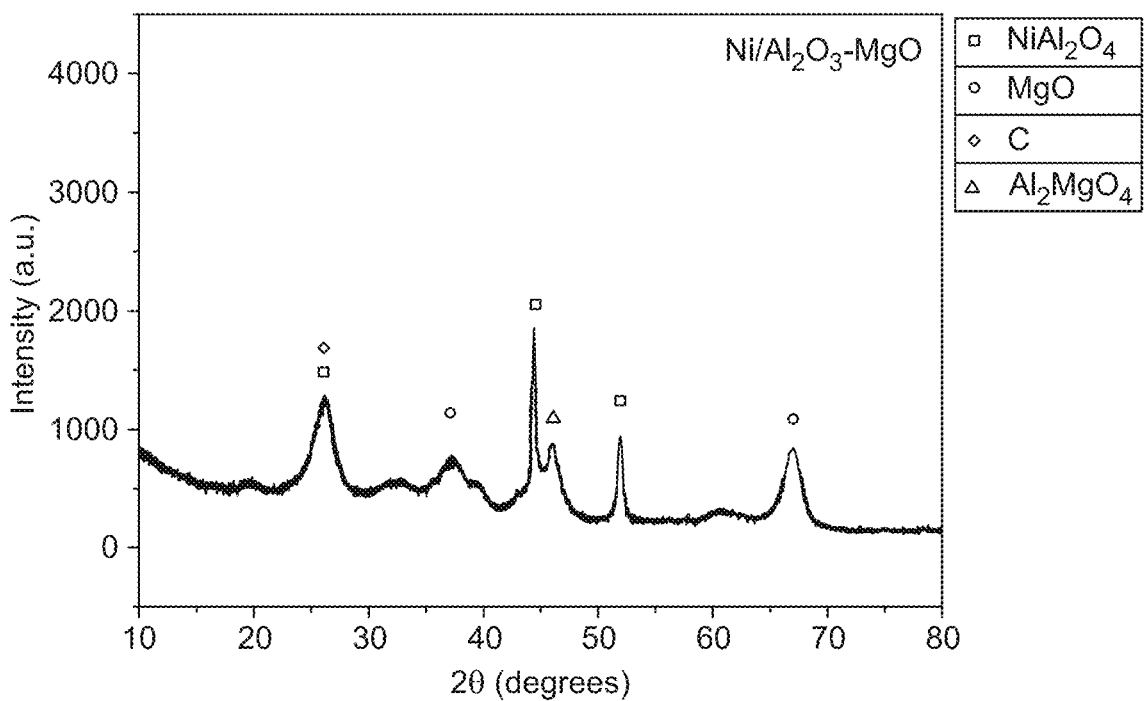
FIG. 7 is an X-Ray Diffraction (XRD) image of a spent Ni/$Al_2O_3$—MgO catalyst.

Referring to FIG. 7, an X-Ray Diffraction (XRD) image of spent Ni/$Al_2O_3$—MgO catalyst is illustrated. The XRD is a technique employed to determine the underlying crystal structure of a material and enables verification of the crystallinity and structure of a sample. Hence, existence of $NiAl_2O_4$, MgO, $Al_2MgO_4$, and C (graphitic) crystals present in the spent Ni/$Al_2O_3$—MgO catalyst is verified.

Figure 8:
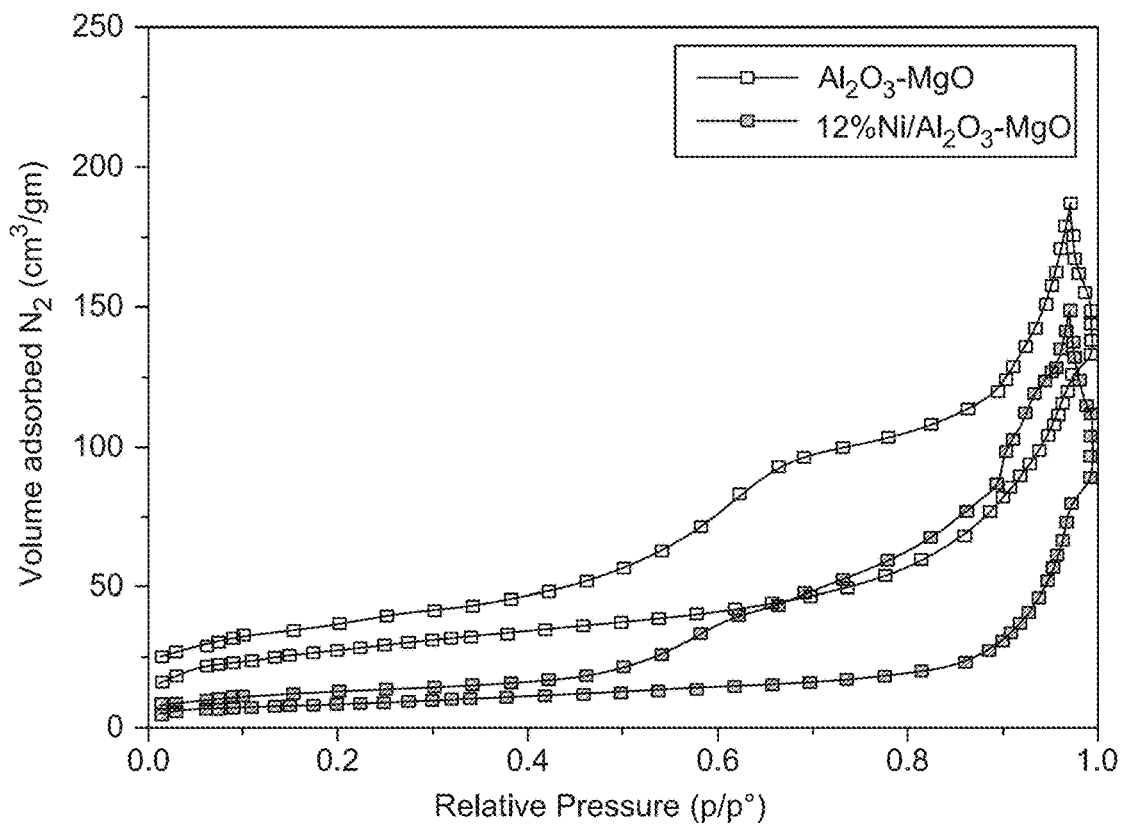
FIG. 8 is a graphical representation of $N_2$ adsorption-desorption isotherms for $Al_2O_3$—MgO and 12% Ni/$Al_2O_3$—MgO.

Referring to FIG. 8, $N_2$ adsorption-desorption isotherms for $Al_2O_3$—MgO and 12% Ni/$Al_2O_3$—MgO are illustrated. A $N_2$ adsorption-desorption isotherm is a plot of relative pressure vs. volume adsorbed obtained by measuring the amount of $N_2$ gas that adsorbs onto the surface of a sorbate such as $Al_2O_3$—MgO and 12% Ni/$Al_2O_3$—MgO, and the subsequent amount that desorbs at a constant temperature. Hysteresis loops of the present graphical representation confirm existence of mesoporous catalysts. According to BET analysis, surface areas of $Al_2O_3$—MgO (support, $Al_2O_3$:MgO=1:2) and 12% Ni/$Al_2O_3$—MgO are 96.1 and 29.3 $m^2$/g, respectively.

Figure 9:
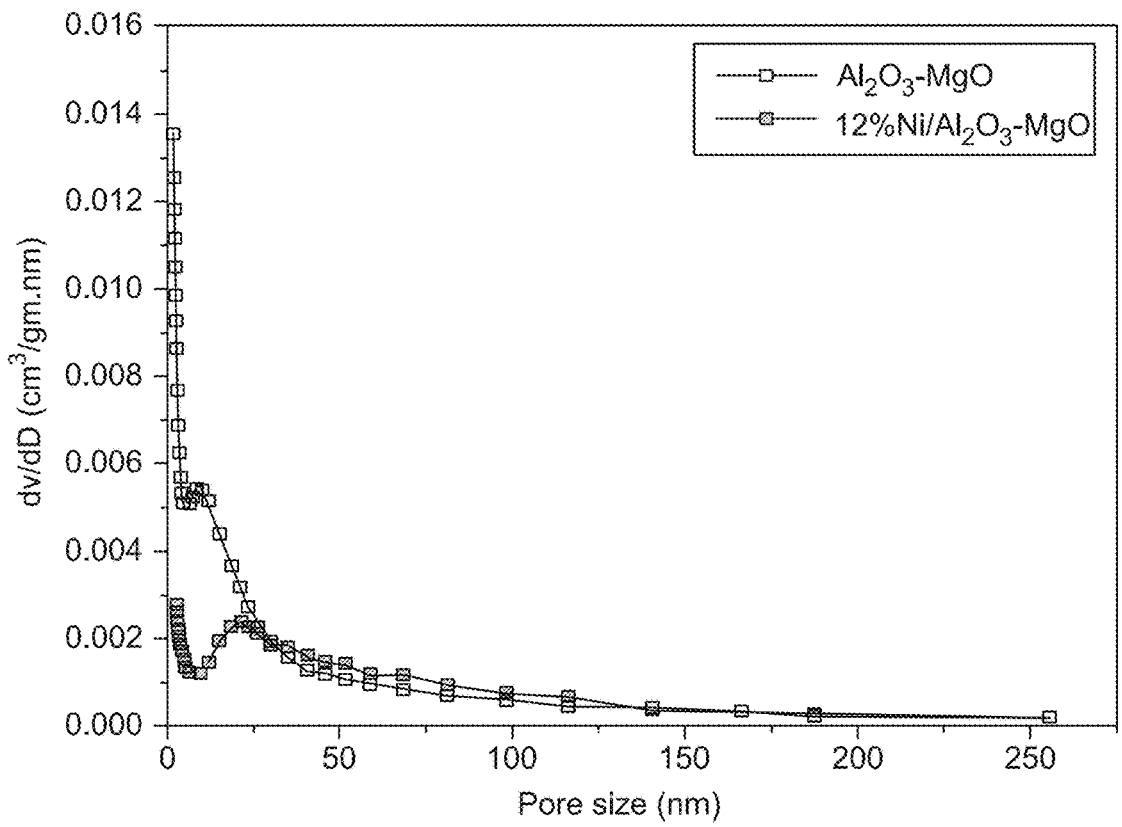
FIG. 9 is a graphical representation of pore size distribution curves for $Al_2O_3$—MgO and 12% Ni/$Al_2O_3$—MgO.

Referring to FIG. 9, pore size distribution curves for $Al_2O_3$—MgO and 12% Ni/$Al_2O_3$—MgO are illustrated. The pore size distribution curves show that $Al_2O_3$—MgO and 12% Ni/$Al_2O_3$—MgO have diameters between 2 and 50 nm. The pore sizes of the porous catalyst support $Al_2O_3$—MgO and 12% Ni/$Al_2O_3$—MgO are 12.5 and 26.5 nm, respectively. The pore sizes of $Al_2O_3$—MgO and 12% Ni/$Al_2O_3$—MgO allow binding or adsorption of the 12% Ni/$Al_2O_3$—MgO over the porous catalyst support. According to Barrett-Joyner-Halenda (BJH) average pore size of the $Al_2O_3$—MgO (support, $Al_2O_3$:MgO=1:2) and 12% Ni/$Al_2O_3$—MgO are 12.5 and 26.5 nm. Further, pore volume of $Al_2O_3$—MgO (support, $Al_2O_3$:MgO=1:2) and 12% Ni/$Al_2O_3$—MgO are 0.26 and 0.21 cm$^3$/g.

TABLE 2

Textural properties of catalyst supports and catalyst

| Catalyst | BET surface area$^3$ (m$^2$/g) | BJH average pore size (nm) | Pore volume (cm$^3$/g) |
| --- | --- | --- | --- |
| $Al_2O_3$ (support) | 125 | 10 | 0.17 |
| 10%Ni/$Al_2O_3$ | 39.6 | 21.4 | 0.15 |
| $Al_2O_3$—MgO (support, $Al_2O_3$: MgO = 1:2) | 96.1 | 12.5 | 0.26 |
| 12% Ni/$Al_2O_3$—MgO | 29.3 | 26.5 | 0.21 |

Referring to table 2, BET surface areas, BJH average pore sizes and pore volumes of $Al_2O_3$ (support), 10% Ni/$Al_2O_3$, $Al_2O_3$—MgO (support, $Al_2O_3$:MgO=1:2), 12% Ni/$Al_2O_3$—MgO are shown. BJH average pore sizes of $Al_2O_3$—MgO (support, $Al_2O_3$:MgO=1:2) and 12% Ni/$Al_2O_3$—MgO have been increased with respect to BJH average pore sizes of $Al_2O_3$ and 10% Ni/$Al_2O_3$. Further, pore volumes of $Al_2O_3$—MgO (support, $Al_2O_3$:MgO=1:2) and 12% Ni/$Al_2O_3$—MgO have been increased with respect to the pore volumes of $Al_2O_3$ and 10% Ni/$Al_2O_3$.

Figure 10A:
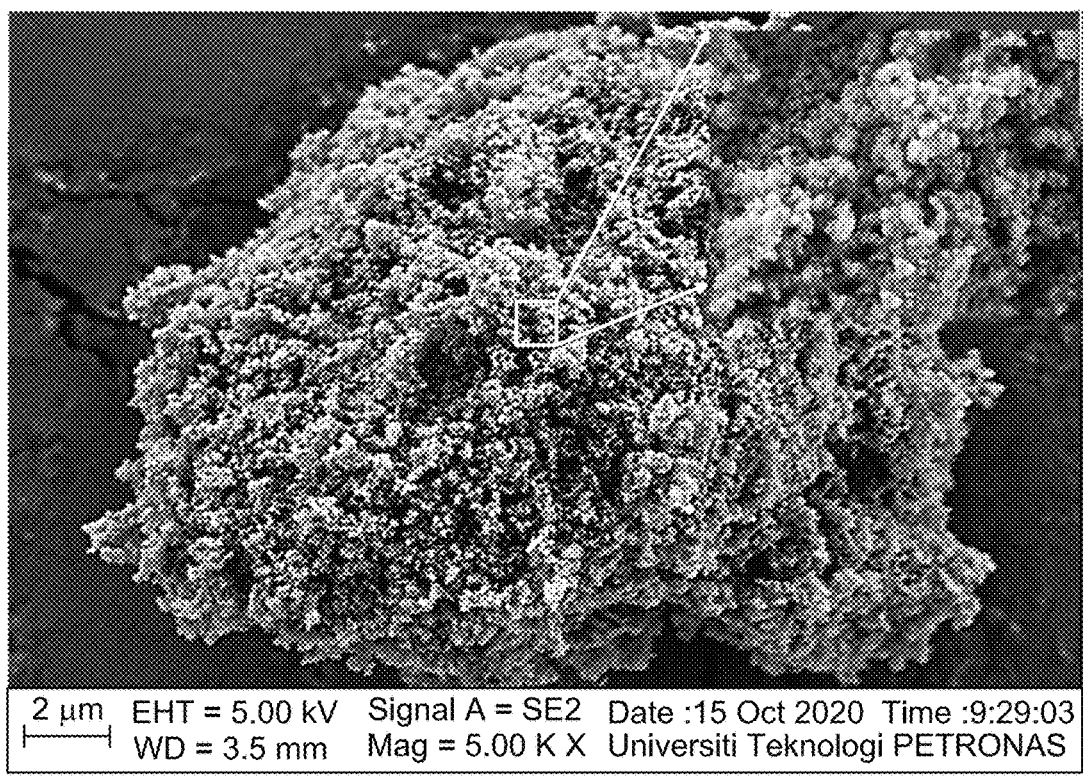
FIGS. 10A-10B are Field Emission Scanning Electron Microscopy (FESEM) images of monometallic 12% Ni/$Al_2O_3$—MgO fresh and spent catalysts.
Figure 10B:
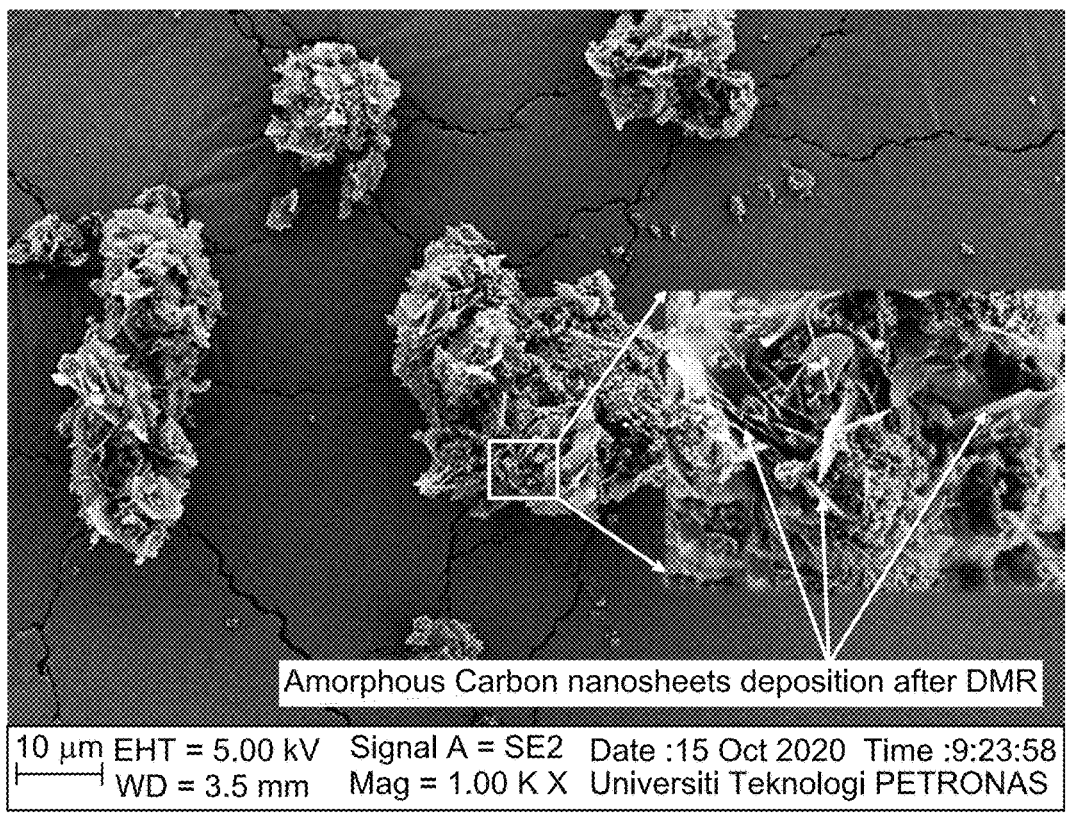

Referring to FIGS. 10A-10B, Field Emission Scanning Electron Microscopy (FESEM) images of monometallic 12% Ni/$Al_2O_3$—MgO fresh and spent catalysts are illustrated. Spherical structures illustrated in FIG. 10A represent 12% Ni/$Al_2O_3$—MgO fresh catalyst. Further, amorphous carbon nanosheets (FIG. 10B) are formed in the spent 12% Ni/$Al_2O_3$—MgO as deposition of carbon formed during the side reactions of the DRM reaction. The deposition of carbon has changed the structure of 12% Ni/$Al_2O_3$—MgO. FIGS. 10A and 10B indicate nonparticipation and participation of 12% Ni/$Al_2O_3$—MgO in the DRM reaction, respectively. FIG. 10B confirms the progression of the DRM reaction.

Figure 11A:
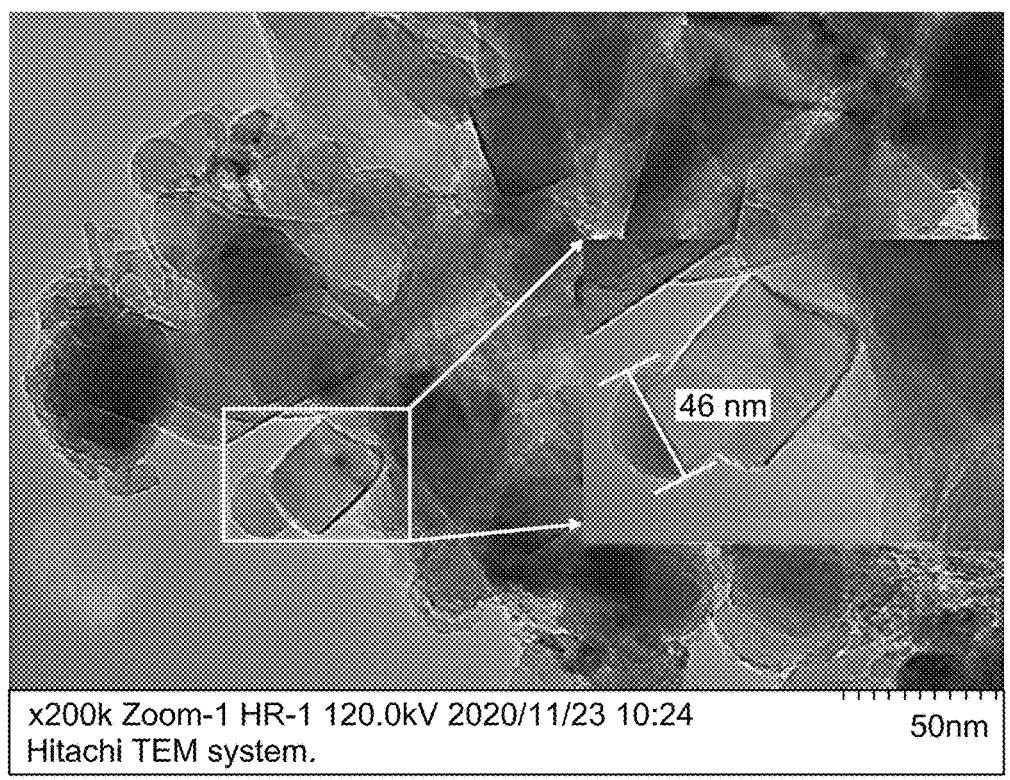
FIGS. 11A-11B are Transmission Electron Microscopy (TEM) images of the monometallic 12% Ni/$Al_2O_3$—MgO fresh and spent catalysts.
Figure 11B:
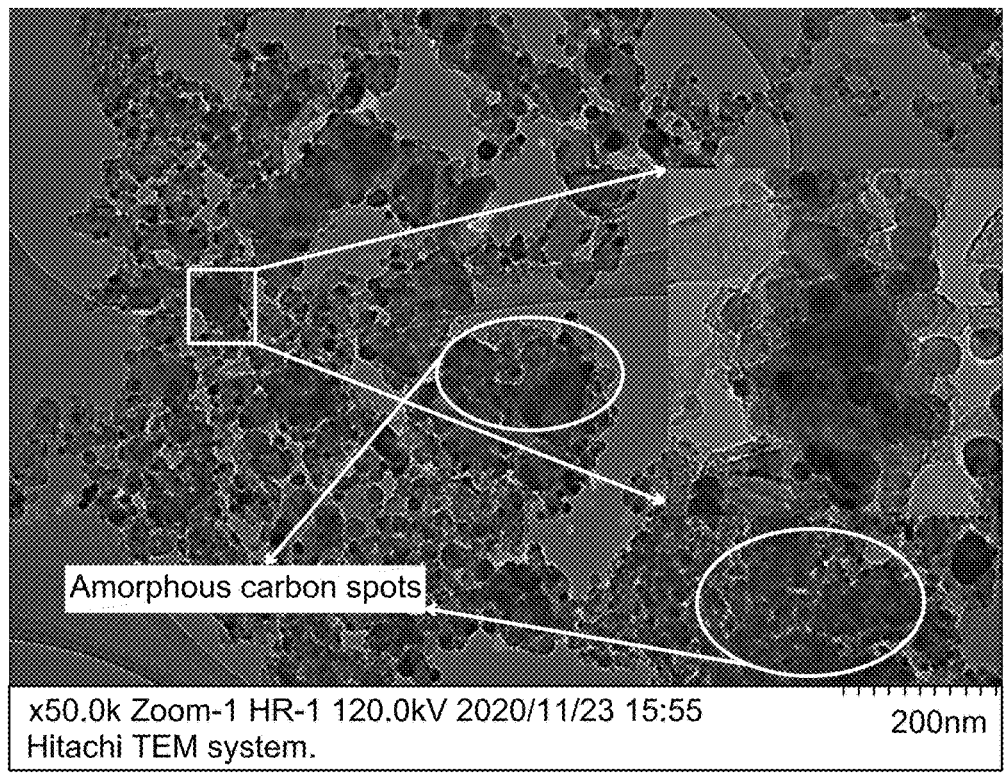

Referring to FIGS. 11A-11B, Transmission Electron Microscopy (TEM) images of the monometallic 12% Ni/$Al_2O_3$—MgO fresh and spent catalysts are illustrated. FIG. 11A shows spherical shaped nanoparticles present on squared shaped structures of $Al_2O_3$—MgO. The nanoparticles having size of 43 nm are present on the surface of $Al_2O_3$—MgO. Nanoparticles with size smaller than 43 nm may fit in the pores of $Al_2O_3$—MgO. FIG. 11B shows clusters of spherical structures consisting of amorphous carbon on the 12% Ni/$Al_2O_3$—MgO spent catalyst. FIGS. 11A and 11B indicate nonparticipation and participation of 12% Ni/$Al_2O_3$—MgO in the DRM reaction, respectively. FIG. 11B confirms the progression of the DRM reaction.

Referring to FIGS. 12A-12B, Energy Dispersive X-Ray Analysis (EDX) spectra of the monometallic 12% Ni/$Al_2O_3$—MgO fresh and spent catalysts are illustrated. Weight percentage of Mg, O, Ni, Al has been reduced in the 12% Ni/$Al_2O_3$—MgO spent catalyst with respect to the 12% Ni/$Al_2O_3$—MgO fresh catalyst. The reduced weight percentage of Mg, O, Ni, Al is due to coking of 12% Ni/$Al_2O_3$—MgO (FIG. 12B). Further, carbon weight percentage is also shown in FIG. 12B. Carbon weight percentage shows participation of 12% Ni/$Al_2O_3$—MgO in the DRM reaction.

Figure 13A:
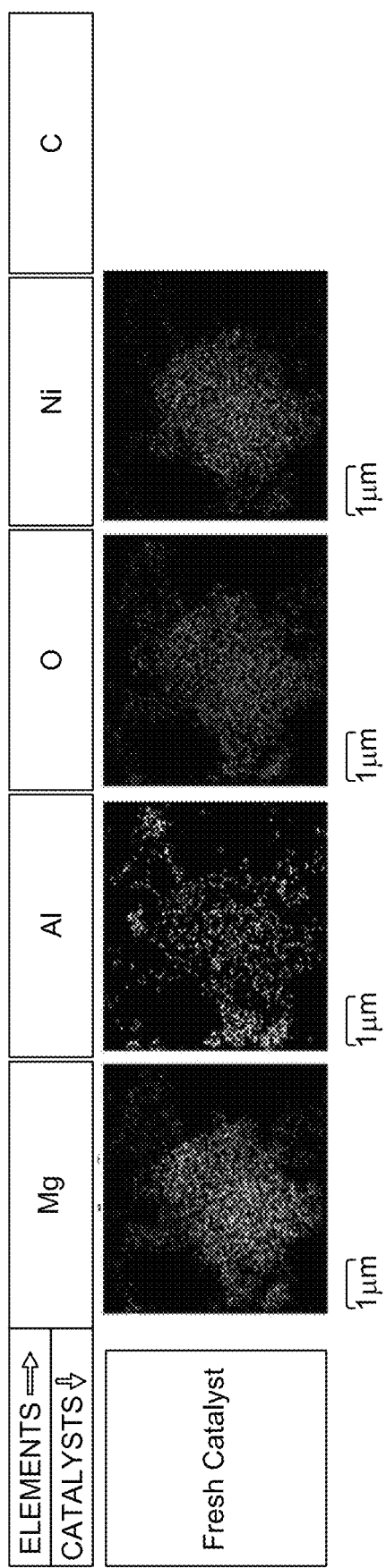
FIGS. 13A-13B are images of elemental mapping of the monometallic 12% Ni/$Al_2O_3$—MgO fresh and spent catalysts.
Figure 13B:
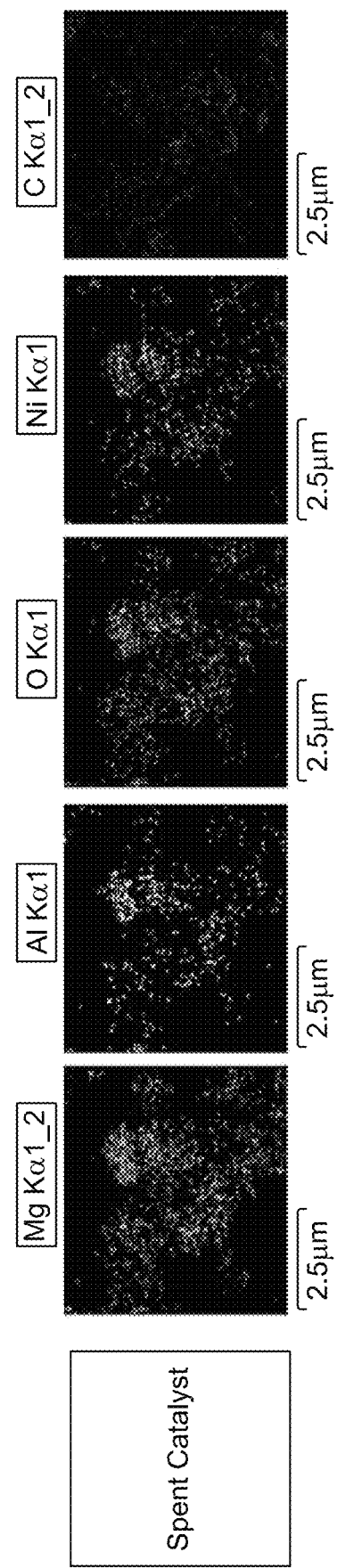

Referring to FIGS. 13A-13B, elemental mapping of the monometallic 12% Ni/$Al_2O_3$—MgO fresh and spent catalysts are illustrated. Elemental mapping of the monometallic 12% Ni/$Al_2O_3$—MgO fresh and spent catalysts are results of EDX. Elemental mapping of the monometallic 12% Ni/$Al_2O_3$—MgO fresh catalyst shows elements such as Mg, Al, O, Ni. However, elemental mapping of the monometallic 12% Ni/$Al_2O_3$—MgO spent catalyst also shows C besides elements such as Mg, Al, O, Ni. FIG. 13A shows absence of carbon. Further, FIG. 13B shows deposition of carbon over 12% Ni/$Al_2O_3$—MgO. Hence, 12% Ni/$Al_2O_3$—MgO (FIG. 13B) is a spent catalyst. Further, the monometallic 12% Ni/$Al_2O_3$—MgO spent catalyst confirms the progression of the DRM reaction.

Figure 14A:
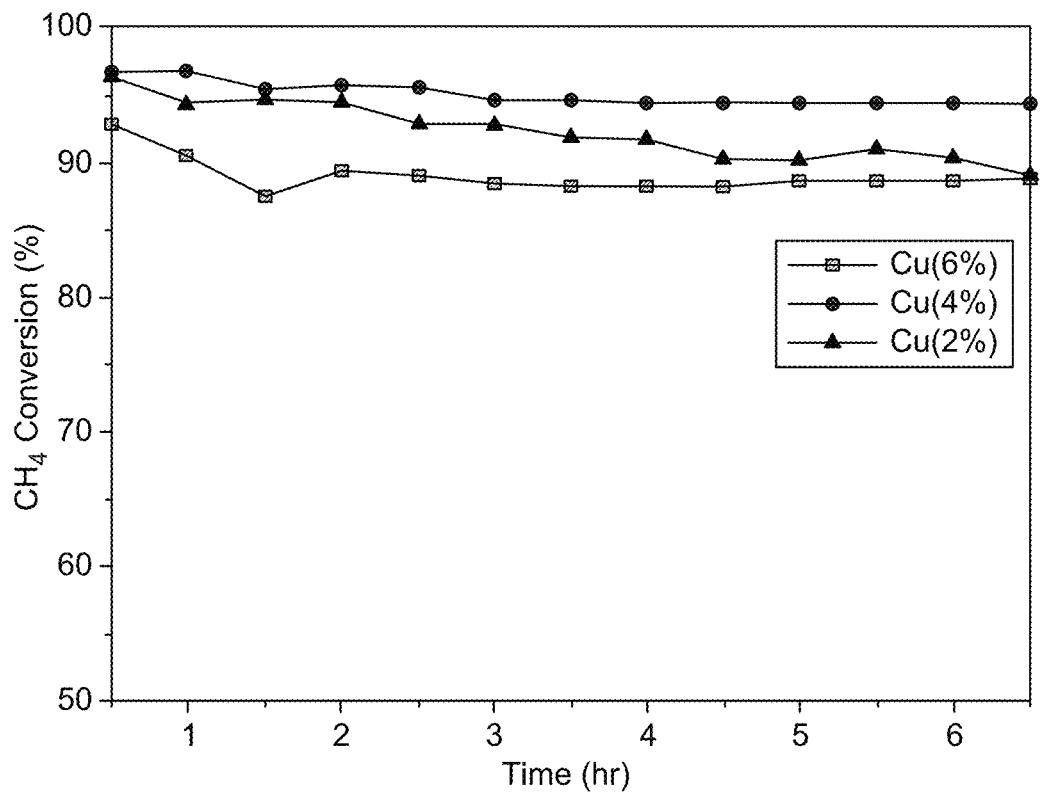
FIGS. 14A-14C are graphical representations showing performance of bimetallic supported catalysts with different weight percentages of copper catalyst.
Figure 14B:
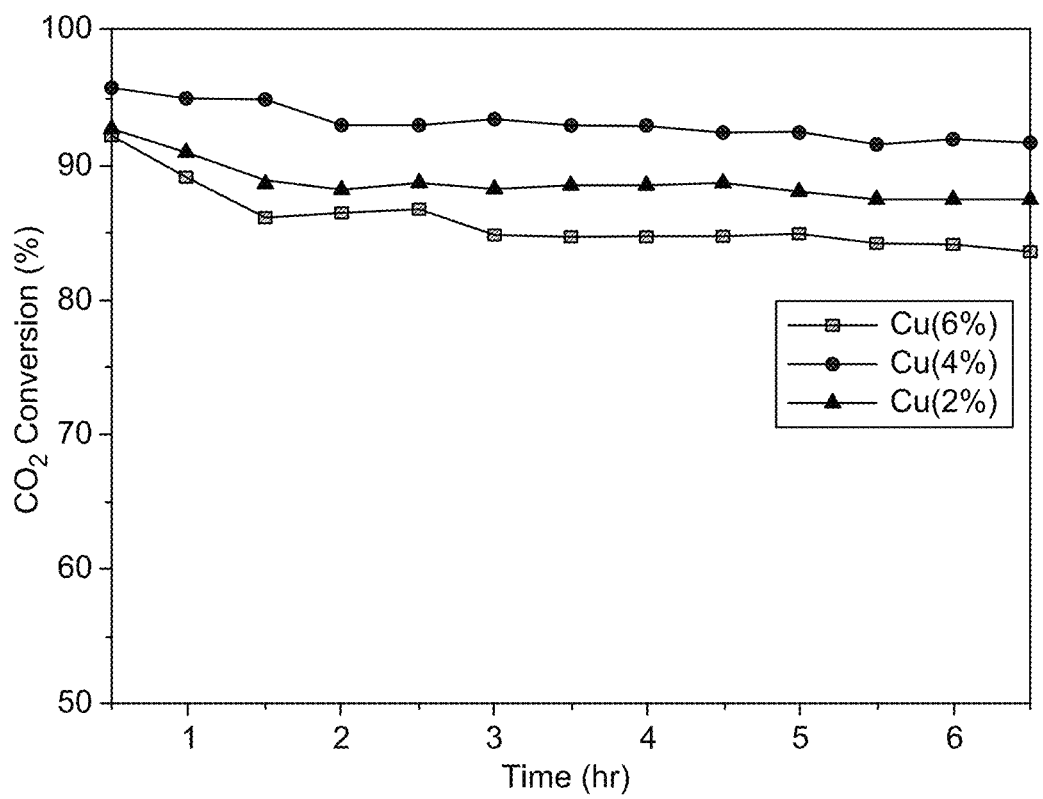
Figure 14C:
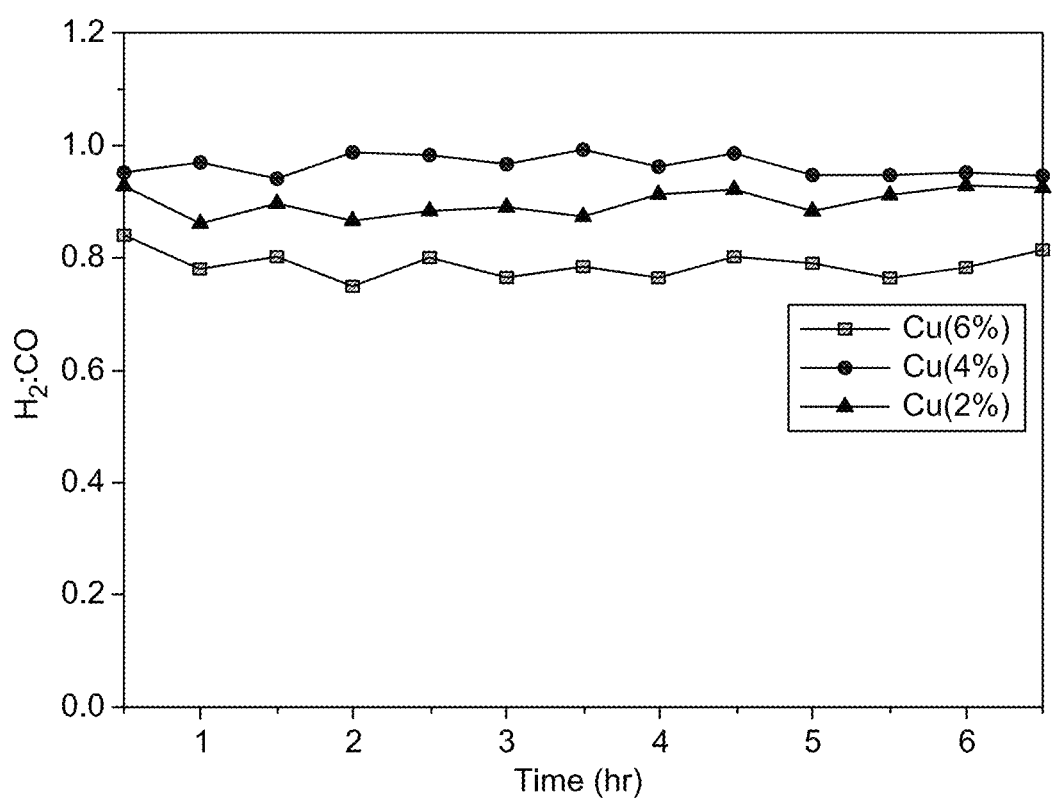
Figure 15A:
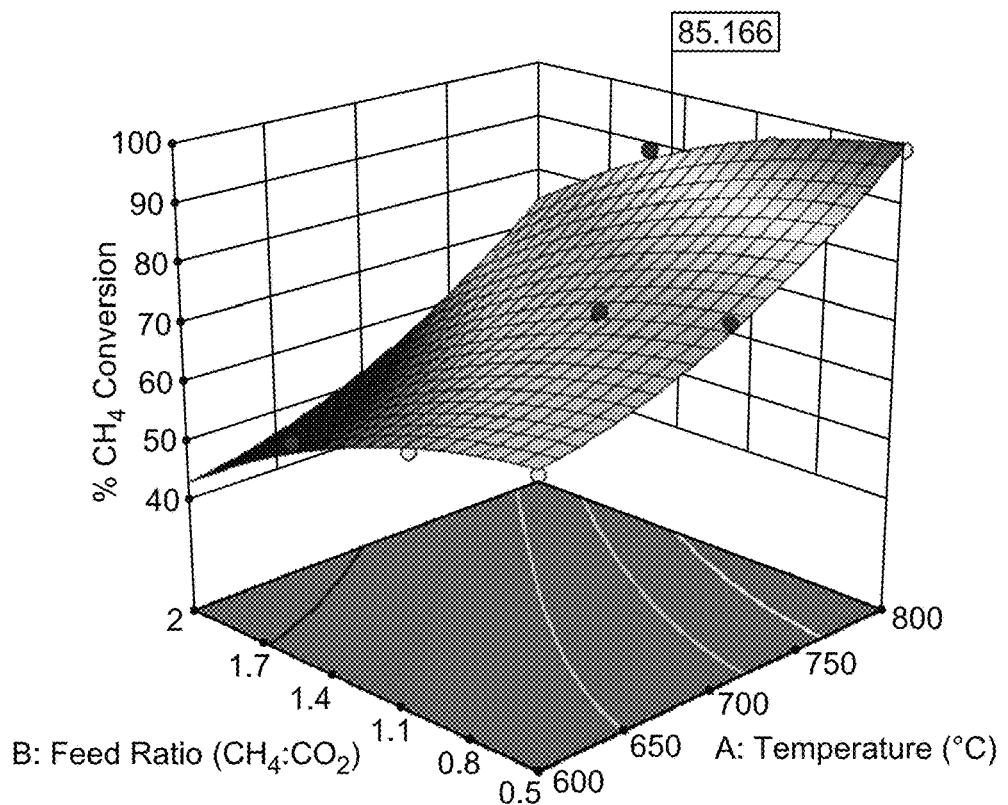
FIGS. 15A-15D are three-dimensional (3D) response surface plots displaying effects of reaction temperature and feed ratio on $CH_4$ conversion, $CO_2$ conversion, $H_2$:CO, and Desirability, respectively for bimetallic supported catalysts.
Figure 15B:
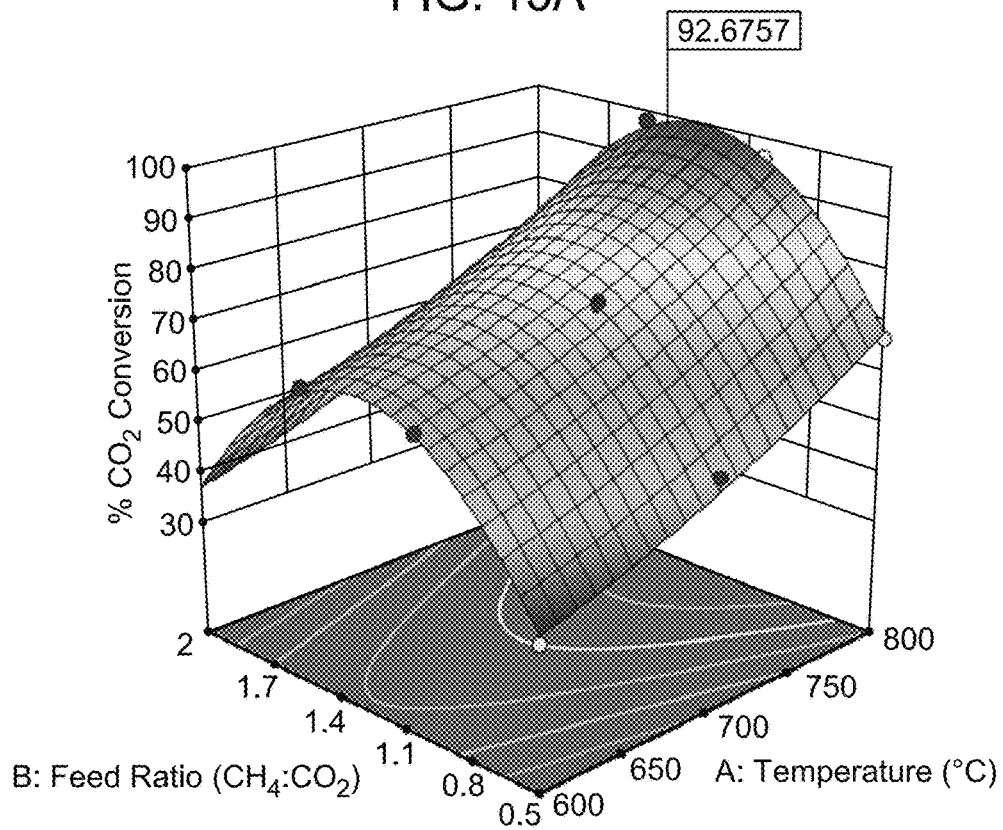
Figure 15C:
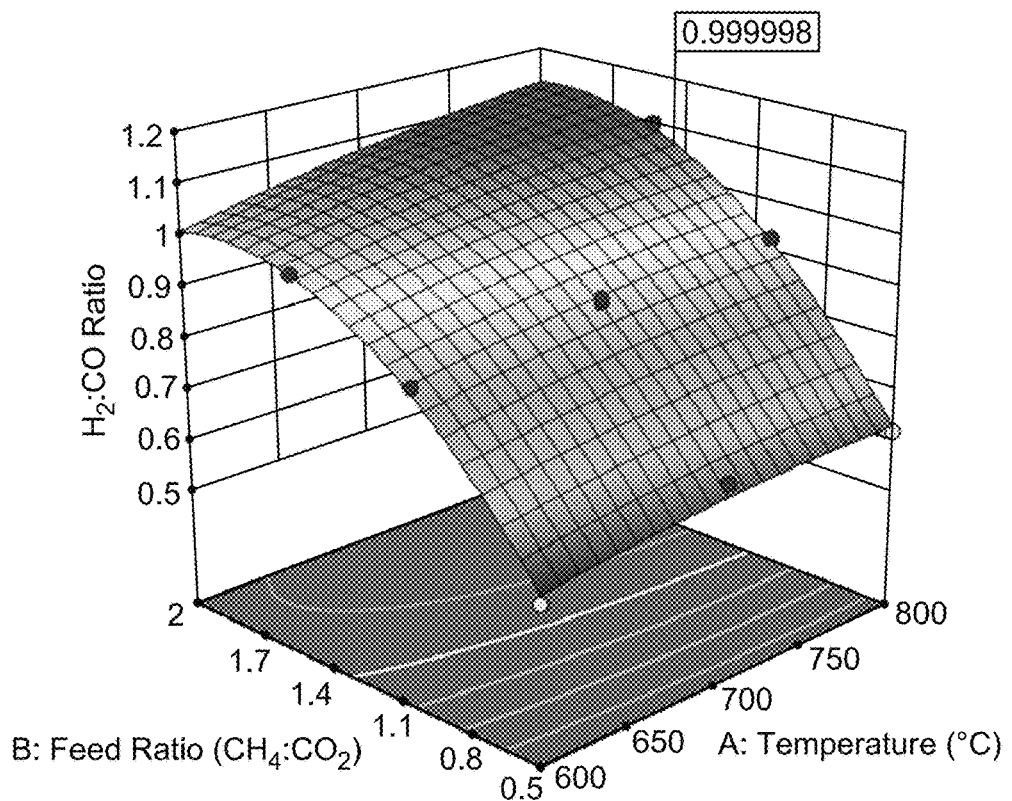
Figure 15D:
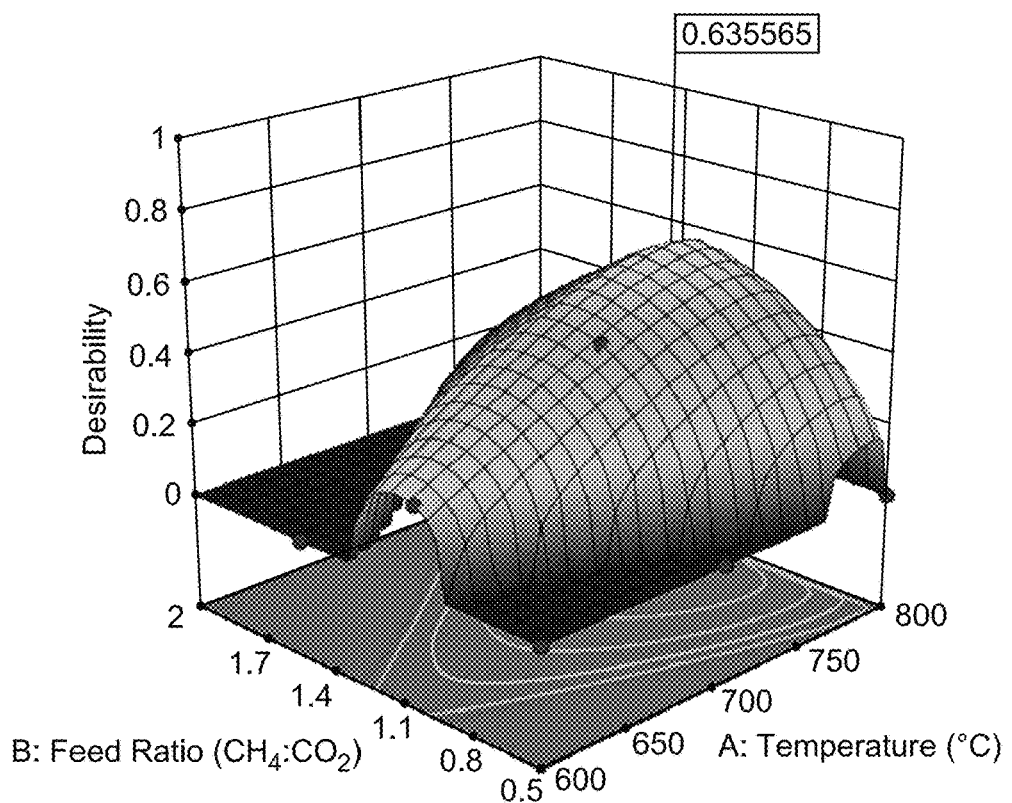
Figure 16A:
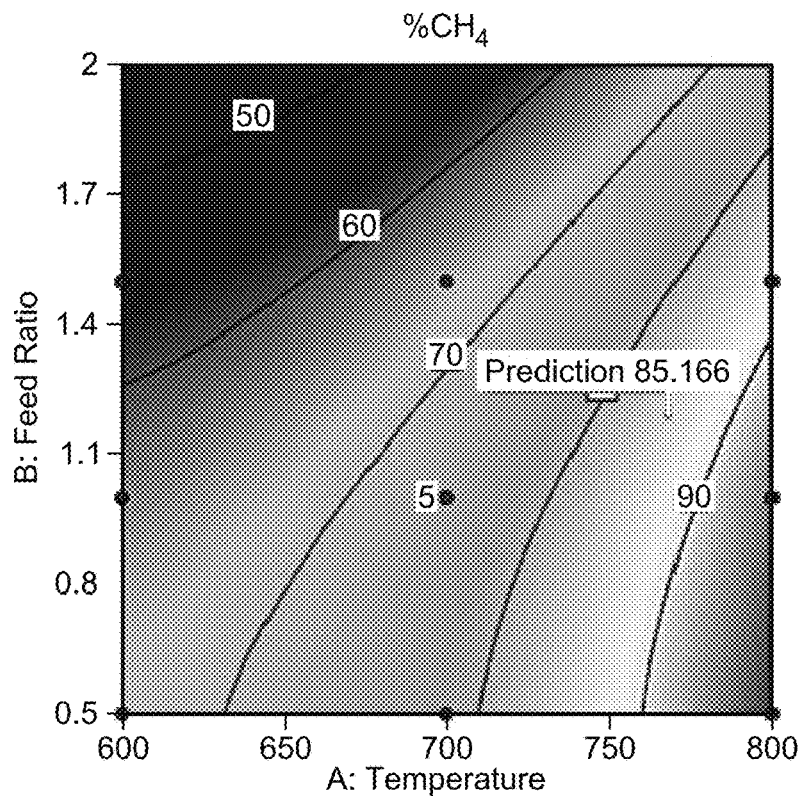
FIGS. 16A-16D are contour plots of the 3D response surface plots of FIGS. 15A-15D, respectively, displaying effects of reaction temperature and feed ratio on $CH_4$ conversion, $CO_2$ conversion, $H_2$:CO, and Desirability for bimetallic supported catalysts.
Figure 16B:
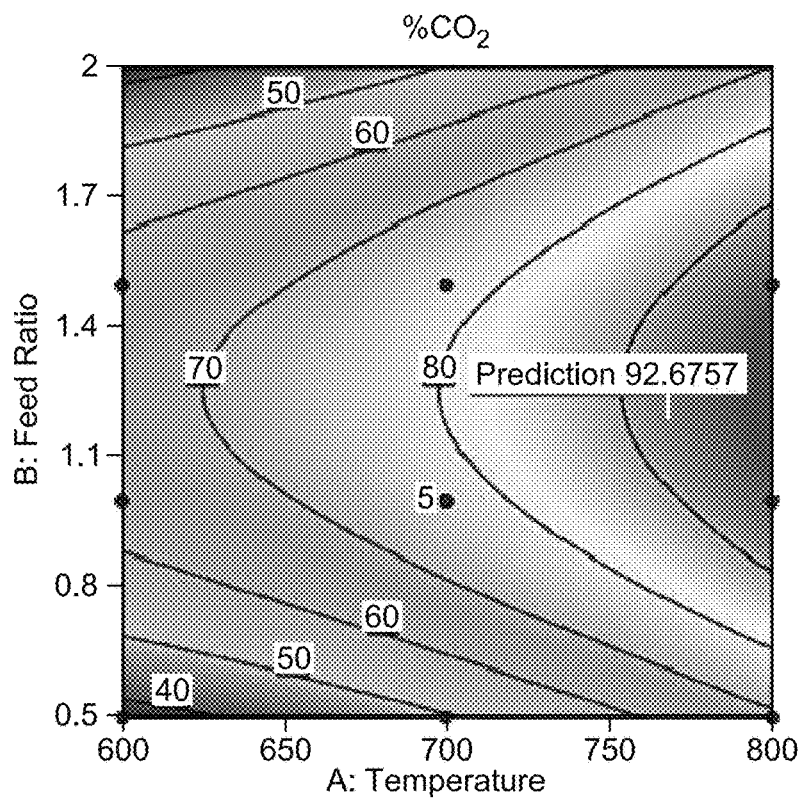
Figure 16C:
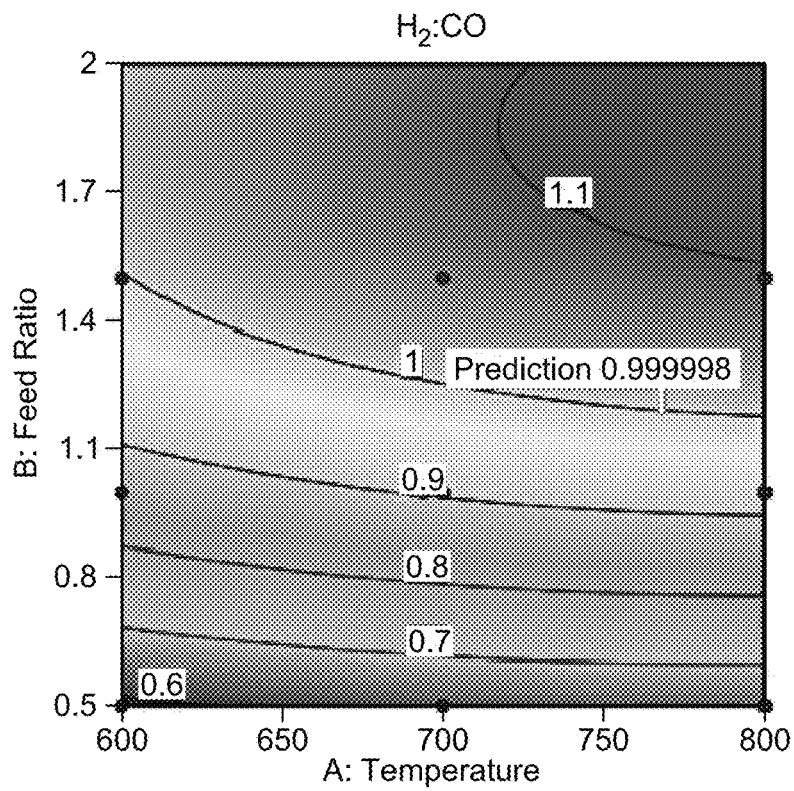
Figure 16D:
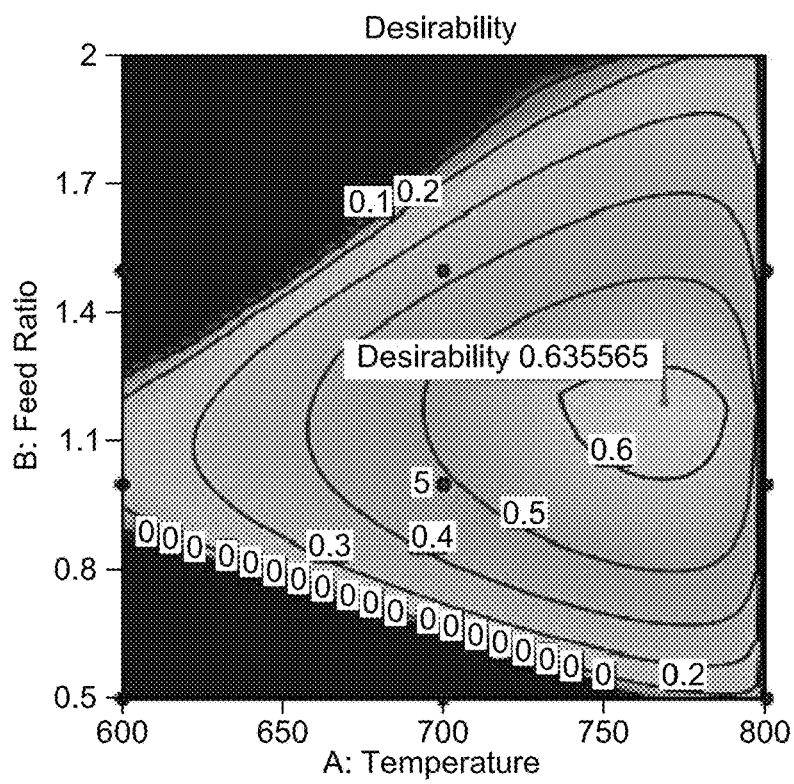

Referring to FIGS. 14A-14C, graphical representations of performance of bimetallic supported catalysts with different weight percentages of Cu are illustrated. On increasing weight percentage of Cu from 2% to 4% has increased the efficiency of the bimetallic supported catalyst. However, on further increase of Cu from 4% to 6% has decreased the efficiency of the bimetallic supported catalyst. A 4 wt. % Cu loaded catalyst has shown maximum conversions of initial methane and carbon dioxide with respect to 6 wt. % Cu and 2 wt. % Cu loaded catalysts. Further, maximum syngas production is observed with the 4 wt. % Cu loaded catalyst in comparison to the 6 wt. % Cu and 2 wt. % Cu loaded catalysts. Hence, the 4 wt. % Cu loaded catalyst showed the highest activity durability.

The 4 wt. % Cu loaded catalyst is further used with process parameters. The process parameters (i.e., temperature [A], and $CH_4$:$CO_2$ feed ratio [B]) along with 4 wt. % Cu loaded catalyst have been carried out via Central Composite Design (CCD) tool of Response Surface Methodology (RSM) from Design Expert-12 software. The process parameters are explained through below tables.

TABLE 3

The input process parameters for CCD with coded representation.

| Input process parameter | Symbol | Coded values | | |
| --- | --- | --- | --- | --- |
| | | −1 | 0 | +1 |
| Temperature (° C.) | A | 600 | 700 | 800 |
| Feed Ratio ($CH_4$:$CO_2$) | B | 0.5 | 1 | 1.5 |

TABLE 4

Design of experiments techniques (DOE) suggested by CCD along with responses obtained.

| Input Process Parameters | | Response | | |
| --- | --- | --- | --- | --- |
| (Coded values) | | $CH_4$ | $CO_2$ | |
| Run | A: Temperature | B: Feed Ratio ($CH_4$:$CO_2$) | Conversion (%) | Conversion (%) | $H_2$:CO Ratio |
| 1 | +1 | 0 | 95 | 96 | 0.93 |
| 2 | 0 | +1 | 63 | 75 | 1.05 |
| 3 | 0 | −1 | 80 | 52 | 0.65 |
| 4 | 0 | 0 | 75.2 | 77 | 0.91 |
| 5 | −1 | +1 | 57 | 65 | 1 |

TABLE 4-continued

Design of experiments techniques (DOE) suggested by CCD along with responses obtained.

| | Input Process Parameters (Coded values) | | Response | | |
|---|---|---|---|---|---|
| | | | $CH_4$ | $CO_2$ | |
| Run | A: Temperature | B: Feed Ratio ($CH_4$:$CO_2$) | Conversion (%) | Conversion (%) | $H_2$:CO Ratio |
| 6 | +1 | +1 | 89 | 98 | 1.1 |
| 7 | 0 | 0 | 74.4 | 77.8 | 0.9 |
| 8 | −1 | −1 | 67 | 35 | 0.57 |
| 9 | +1 | −1 | 99 | 67 | 0.62 |
| 10 | 0 | 0 | 73.5 | 76 | 0.9 |
| 11 | 0 | 0 | 75.5 | 76.5 | 0.92 |
| 12 | −1 | 0 | 63 | 64.5 | 0.87 |
| 13 | 0 | 0 | 75 | 76 | 0.88 |

The quadratic model (in coded process parameter terms) obtained after ANOVA analysis are:

$$CH_4 \text{ conversion } (\%) = 74.32 + 14.98A - 5.98B + 0.175AB + 5.18A2 - 1.02B2 \quad (1)$$

$$CO_2 \text{ conversion } (\%) = 76.51 + 15.33A + 15.80B + 0.3AB + 3.35A213.05B2 \quad (2)$$

$$H_2:CO = 0.9507 - 0.045A + 0.2217B - 0.0577A2 - 0.0774B2 \quad (3)$$

TABLE 5

Goals and responses of input process variables and responses.

| Name | Goal | Lower Limit | Upper Limit |
|---|---|---|---|
| Process variables | | | |
| A: Temperature (C) | Minimize | 600 | 800 |
| B: Feed Ratio | In range | 0.5 | 1.5 |
| Responses | | | |
| $CH_4$ conversion (%) | Maximize | 60 | 100 |
| $CO_2$ conversion (%) | Maximize | 60 | 100 |
| $H_2$:CO | Target = 1 | 0.6 | 1.2 |

Referring to FIGS. 15A-15D and 16A-16D, three-dimensional (3D) response surface plots displaying the effects of reaction temperature and feed ratio on $CH_4$ conversion, $CO_2$ conversion, $H_2$:CO, and Desirability and contour plots, respectively, are illustrated. A set of 13 experiments were carried out for desirable study at temperature of 600° C. to 800° C. and feed ratio ($CH_4$:$CO_2$) of 0.5-1.5). A syngas ratio directly enhanced the feed ratio since hydrogen is produced from $CH_4$ during the DRM reaction. Input conditions for temperature and feed ratio were 768.28° C. and 1.19, respectively, with the desirability of 0.636. The desired conversions of $CH_4$ and $CO_2$ are 86.1% and 90.5%. According to table 5, the desirable syngas ratio should be unity. Further, the desired syngas ($H_2$:CO) ratio is almost unity.

The present disclosure provides the bimetallic supported catalyst involved in the DRM reaction. The bimetallic supported catalyst helps in fixing GHGs by producing a clean fuel, i.e., hydrogen. Syngas production (with $H_2$:CO of unity), can be directly utilized in Fischer-Tropsch synthesis for synthesis of higher hydrocarbons. A two-step synthesis technique shows better results in terms of catalytic performance and activity with respect to a single step (co-precipitation) method.

Employing D-Block elements such as Ni and Cu result in comparable activity, economic syngas production, and easily available catalyst for the DRM reaction. The bimetallic catalyst delivers more than 90% conversion of reactant gases even after 6 h of the DRM reaction. The bimetallic catalyst reduces an operating temperature range and economize the DRM reaction. The bimetallic supported catalyst is calcined at 850° C. with a ramping rate of 5° C./min. The bimetallic supported catalyst is more stable with respect to catalysts calcined at lower temperatures. The bimetallic catalyst inhibits side reactions such as reverse water-gas shift reaction (RWGS). Further, Cu increases the activity and durability of a catalyst. Hence, the bimetallic catalyst shows enhanced performance compared to a monometallic Ni catalyst.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of dry reforming of methane ($CH_4$), comprising
    contacting at a temperature of 500 to 1000 degree Celsius (° C.) a reactant gas mixture comprising methane and carbon dioxide ($CO_2$) with a bimetallic supported catalyst comprising a porous catalyst support comprising aluminum oxide ($Al_2O_3$) and magnesium oxide (MgO) and a bimetallic catalyst comprising nickel (Ni) and copper (Cu) disposed on the porous catalyst support; and
    collecting a product gas mixture comprising hydrogen ($H_2$) and carbon monoxide (CO),
    wherein the bimetallic supported catalyst comprises 8 to 16 weight percent (wt. %) nickel and 4 wt. % copper, each based on a total weight of the bimetallic supported catalyst,
    wherein 90-92.5% of the methane and 90-95% of the $CO_2$ in the reactant gas mixture is converted to form the hydrogen ($H_2$) and carbon monoxide (CO) in the product gas mixture over 6 hours of the contacting.

2. The method of claim 1, wherein the porous catalyst support has a molar ratio of aluminum oxide to magnesium oxide of 1:1.05 to 1:4.

3. The method of claim 2, wherein the porous catalyst support has a molar ratio of aluminum oxide to magnesium oxide of 1:1.75 to 1:2.25.

4. The method of claim 1, wherein the bimetallic supported catalyst has a Brunner-Emmett-Teller (BET) surface area of 5 to 55 meter square per gram ($m^2$/g).

5. The method of claim 1, wherein the bimetallic supported catalyst has a mean pore size of 10 to 43 nanometer (nm) and a mean pore volume of 0.15 to 0.37 centimeter cube per gram ($cm^3$/g).

6. The method of claim 1, wherein the bimetallic catalyst is present as nanoparticles comprising nickel and copper.

7. The method of claim 6, wherein the nanoparticles have a weight ratio of nickel to copper of 6:1 to 1.5:1.

8. The method of claim 7, wherein the nanoparticles have a weight ratio of nickel to copper of 3.5:1 to 2.5:1.

9. The method of claim 6, wherein the nanoparticles have a mean particle size of 15 to 75 nm.

10. The method of claim 1, wherein the reactant gas mixture has a molar ratio of methane to carbon dioxide of 0.9:1 to 1.5:1.

11. The method of claim 10, wherein the reactant gas mixture has a molar ratio of methane to carbon dioxide of 1.10:1 to 1.30:1.

12. The method of claim 1, wherein the product gas mixture has a molar ratio of hydrogen to carbon monoxide of 0.90:1 to 1.1:1.

13. The method of claim 1, wherein the reactant gas mixture is substantially free of water ($H_2O$).

14. The method of claim 1, wherein the contacting takes place in a reactor,
   wherein the reactor comprises a tubular member having a square cross section,
   wherein the tubular member comprises:
      a catalytic bed;
      an inlet;
      an outlet; and
      a furnace,
   wherein the catalytic bed is configured to hold the bimetallic supported catalyst,
   wherein the furnace comprises a plurality of heating coils attached to an inner surface of the furnace, wherein the plurality of heating coils heat the catalytic bed, and
   wherein the tubular member is configured to have the reactant gas mixture enter through the inlet, pass over the catalytic bed with the bimetallic supported catalyst, and then collecting the product gas mixture through the outlet.

15. The method of claim 14, wherein the bimetallic catalyst is in the form of nanoparticles, and the nanoparticles are Janus particles having a nickel side and a copper side.

16. The method of claim 14, wherein the contacting is for 6 hours, the temperature is 800° C., and a molar ratio of methane to carbon dioxide in the reactant gas mixture is 1:1, and
   wherein the bimetallic supported catalyst comprises 12 wt. % nickel based on a total weight of the bimetallic supported catalyst.

17. The method of claim 16, wherein the porous catalyst support has a molar ratio of aluminum oxide to magnesium oxide of 1:2.

* * * * *